United States Patent
Lee et al.

(10) Patent No.: US 8,520,945 B2
(45) Date of Patent: Aug. 27, 2013

(54) APPARATUS FOR COLOR INTERPOLATION USING ADJUSTABLE THRESHOLD

(75) Inventors: Ho-young Lee, Seoul (KR); Jun-Oh Park, Seoul (KR)

(73) Assignee: Mtekvision Co., Ltd., Seoul (KR)

( * ) Notice: Subject to any disclaimer, the term of this patent is extended or adjusted under 35 U.S.C. 154(b) by 0 days.

(21) Appl. No.: 13/336,943

(22) Filed: Dec. 23, 2011

(65) Prior Publication Data

US 2012/0093405 A1  Apr. 19, 2012

Related U.S. Application Data

(62) Division of application No. 12/159,365, filed as application No. PCT/KR2006/005884 on Dec. 29, 2006, now Pat. No. 8,184,905.

(30) Foreign Application Priority Data

| Dec. 29, 2005 | (KR) | 10-2005-0132905 |
| Dec. 29, 2005 | (KR) | 10-2005-0133516 |
| Dec. 29, 2005 | (KR) | 10-2005-0133604 |
| Dec. 29, 2005 | (KR) | 10-2005-0133629 |

(51) Int. Cl.
    *G06K 9/00*    (2006.01)
    *G06K 9/40*    (2006.01)
    *G03F 3/06*    (2006.01)

(52) U.S. Cl.
    USPC .......................... 382/167; 382/266; 358/518

(58) Field of Classification Search
    None
    See application file for complete search history.

(56) References Cited

U.S. PATENT DOCUMENTS

| 5,633,511 | A | * | 5/1997 | Lee et al. ................. 250/587 |
| 5,920,654 | A |   | 7/1999 | Someya et al. |
| 6,714,242 | B1 |  | 3/2004 | Kobayashi |
| 6,904,169 | B2 | * | 6/2005 | Kalevo et al. ............. 382/167 |
| 6,965,395 | B1 |  | 11/2005 | Neter |
| 6,978,050 | B2 | * | 12/2005 | Hunter et al. ............. 382/275 |
| 7,079,705 | B2 | * | 7/2006 | Zhang et al. ............. 382/280 |
| 7,236,191 | B2 |  | 6/2007 | Kalevo et al. |
| 7,319,797 | B2 | * | 1/2008 | Hung .................... 382/260 |
| 7,339,699 | B1 |  | 3/2008 | Suzuki et al. |
| 7,515,747 | B2 | * | 4/2009 | Okutomi et al. ........... 382/167 |
| 7,623,705 | B2 |  | 11/2009 | Arazaki |
| 7,626,624 | B2 | * | 12/2009 | Fraenkel et al. ........... 348/308 |
| 7,916,940 | B2 | * | 3/2011 | Hel-Or .................. 382/167 |
| 8,085,316 | B2 | * | 12/2011 | Ikemoto et al. ........... 348/229.1 |
| 2004/0119861 | A1 |  | 6/2004 | Bosco et al. |
| 2005/0200723 | A1 |  | 9/2005 | Kondo et al. |
| 2006/0050335 | A1 | * | 3/2006 | Dorrell et al. ............. 358/516 |
| 2008/0075394 | A1 |  | 3/2008 | Huang et al. |
| 2011/0211098 | A1 |  | 9/2011 | Bosco et al. |

FOREIGN PATENT DOCUMENTS

| EP | 1 585 343 A2 | 10/2005 |
| JP | 2005-341463 A | 12/2005 |

* cited by examiner

*Primary Examiner* — Randolph I Chu
(74) *Attorney, Agent, or Firm* — Birch, Stewart, Kolasch & Birch, LLP

(57) ABSTRACT

An apparatus for color interpolation using an adjustable threshold is disclosed. The color interpolation apparatus calculates the difference between the maximum value and the minimum value of the elements of the image data and determines the color interpolation method of the image data depending on the difference to perform the corresponding color interpolation. With the present invention, the improved image quality can be provided because the color interpolation can be performed as a user desires.

5 Claims, 32 Drawing Sheets

Figure 4

| R  | G1  | R1 | G2  | R   |
|----|-----|----|-----|-----|
| G3 | B1  | G4 | B2  | G5  |
| R2 | G6  | R3 | G7  | R4  |
| G8 | B3  | G9 | B4  | G10 |
| R  | G11 | R5 | G12 | R   |

Figure 5

| G  | B  | G1 | B  | G  |
|----|----|----|----|----|
| R  | G2 | R1 | G3 | R  |
| G4 | B1 | G5 | B2 | G6 |
| R  | G7 | R2 | G8 | R  |
| G  | B  | G9 | B  | G  |

Figure 6

| 1 | 2 | 1 |
|---|---|---|
| 2 | 4 | 2 |
| 1 | 2 | 1 |

| -1 | -2 | -1 |
|----|----|----|
| 0  | 0  | 0  |
| 1  | 2  | 1  |

Figure 17

| -1 | 0 | 1 |
|----|---|---|
| -2 | 0 | 2 |
| -1 | 0 | 1 |

APPARATUS FOR COLOR INTERPOLATION USING ADJUSTABLE THRESHOLD

CROSS-REFERENCE TO RELATED APPLICATIONS

This application is a Divisional of co-pending application Ser. No. 12/159,365 filed on Jun. 26, 2008, which is the national phase of PCT International Application No. PCT/KR2006/005884, filed Dec. 29, 2006, and which claims priority to Korean Application No. 10-2005-0132905 filed on Dec. 29, 2005, Korean Application No. 10-2005-0133516 filed on Dec. 29, 2005, Korean Application No. 10-2005-0133604 filed on Dec. 29, 2005 and Korean Application No. 10-2005-0133629 filed on Dec. 29, 2005. The entire contents of all of the above applications are hereby incorporated by reference.

BACKGROUND

1. Technical Field

The present invention is related to an apparatus for color interpolation using an adjustable threshold, more specifically to an apparatus, which is employed in an image processing system, for color interpolation using an adjustable threshold.

2. Description of the Related Art

Today's development of multimedia apparatuses makes it possible to perform complicated image processing. This complicated image processing necessarily needs color interpolation.

Typically, the color interpolation creates new color information from pre-existing color information when the standard method of image signal is converted.

Since the color interpolation generates a new component, which is not included in the present pixel by using other components of the periphery of the pixel, a noise having a zipper shape may occur at an area (e.g. edge or boundary) where there are a lot of high frequencies.

To remove this noise, many prior arts have been disclosed. These prior arts, however, apply the same process to all images after the system is completed to be structured. Accordingly, the process is not varied depending on each image. That is, it causes waste of the system efficiency because at least the same noise removing process must be also applied to the image having less noise.

The conventional image processing system, the color interpolation also applies the same process to all images after the system is completed to be structured, which the process is not varied depending on each image.

SUMMARY

The present invention, which is designed to solve the above problems, provides an apparatus for color interpolation using an adjustable threshold in order to apply a different color interpolation method depending on each image by adjusting the threshold in accordance with a particular value in the mask of the image.

The present invention also provides an apparatus for color interpolation using an adjustable threshold in order to reduce a line memory by supplying an edge enhancement coefficient for edge enhancement in color interpolation.

The present invention also provides an apparatus and a method of determining a threshold used for color interpolation in order to apply a different color interpolation method depending on the threshold, determined in accordance with the analysis of the properties of the image inputted according to the exposure.

In addition, the present invention provides an apparatus and a method of determining a threshold used for removing a noise in order to apply a different noise removing method depending on the threshold, determined in accordance with the analysis of the properties of the image inputted according to the exposure.

Other objects of the present invention will become more easily understandable through the embodiments described below.

To achieve the above objects, an aspect of the present invention features an apparatus for color interpolation using an adjustable threshold.

According to an embodiment of the present invention, the color interpolation apparatus can include a color interpolation unit, performing the interpolation of an inputted m×m Bayer pattern image and generating and outputting first output data and second output data, and detecting and outputting first component data and second component data and special data of the m×m Bayer pattern image, m being a predetermined natural number; and a determining unit, outputting an edge enhancement coefficient, the edge enhancement coefficient being determined by using one of the first output data and the second output data, an edge parameter, the first edge component data and the second edge component data, and one of the first output data and the second output data being determined by using the size relationship of the special data, received from the color interpolation unit, and predetermined plural thresholds, respectively. Here, the color interpolation can have a first interpolation unit, performing the bilinear interpolation of the m×m Bayer pattern image and outputting n×n data, n being a predetermined natural number and smaller than m; a second interpolation unit, performing the interpolation of the output data of the first interpolation unit in accordance with the center pixel value of the data, and outputting the first output data of 1 pixel; a first calculating unit, performing the edge detection of the output data of the second interpolation unit, and outputting the first edge component data of 1 pixel; a second calculating unit, performing the edge detection of the output data of the first interpolation unit, and outputting n×n data; a first filter unit, performing the Gaussian filtering of the output data of the second calculating unit, and outputting the second edge component data of 1 pixel; a difference determining unit, determining the difference between the maximum value and the minimum value of the n×n output data of the second calculating unit, and outputting the determined difference as the special value; and a second filer unit, performing the Gaussian filtering of the output data of the first interpolation unit, and outputting the second output data of 1 pixel. Also, the color interpolation apparatus can further include a converting unit converting red/green/blue (RGB) data to luminance (Y)/chrominance (C) data.

The color interpolation apparatus can further include an edge enhancement unit performing an edge enhancement processing by use of the edge enhancement coefficient, considering the Y data converted by the converting unit and an edge flag received from the determining unit, whereas the edge flag is outputted from the determining unit to determine whether the edge enhancement processing is performed by using the edge enhancement coefficient.

The determining unit can output the second output data if the special value is smaller than a predetermined first threshold determined according to the flat level of image. Also, the determining unit can output the first output data and the edge flag, the edge flag referring to no determination of the edge enhancement processing, if the special value is substantially the same as or larger than the first threshold and smaller than a predetermined second threshold determined according to the edge level of image. Moreover, the determining unit can output the first output data the edge flag, the edge flag referring to the determination of the edge enhancement processing, if the difference is substantially the same as or larger than the second threshold.

The edge parameter can have at least one of edge coring, edge gain, edge positive limit and edge negative limit, and the edge enhancement coefficient can be determined by the first edge component data and the second edge component data and the edge parameter.

According to another embodiment of the present invention, the color interpolation apparatus can include a color interpolation unit, performing the interpolation of an inputted Bayer pattern image and generating first output data and second output data, detecting first edge component data and second edge component data of image, and detecting the difference between the maximum value and the minimum value of the elements of the first and second component data; a first determining unit, determining the output according to the difference from the color interpolation unit, and determining an edge enhancement coefficient by using the first and second edge component data and an edge parameter; a second determining, determining the maximum value and the minimum value of the elements of the output data of the first determining unit; and a removing unit, determining the noise removing method of the image data according to the difference, received from the color interpolation unit, and the maximum value and the minimum value, received from the second determining unit, and performing the corresponding noise removing.

The color interpolation unit has a first interpolation unit, performing the bilinear interpolation of the inputted 7×7 Bayer pattern image, and outputting 3×5 data; a second interpolation unit, performing the interpolation of the output data of the first interpolation unit according to the center pixel value of the data, and outputting 3×3 first output data; a first calculating unit, performing the edge detection of the output data of the second interpolation unit, and outputting the 3×3 first edge component data; a second calculating unit, performing the edge detection of the output data of the first interpolation unit, and outputting 5×5 data; a first filter unit, performing the Gaussian filtering of the output data of the second calculating unit, and outputting the 3×3 second edge component data; a difference determining unit, determining the difference between the maximum value and the minimum value of the 5×5 output data of the second calculating unit; and a second filter unit, performing the Gaussian filtering of the output data of the first calculating unit, and outputting 3×3 second output data.

The first determining unit outputs the second output data if the difference is smaller than a predetermined first threshold determined according to the noise level of image; outputs the first output data and the edge flag of zero if the difference is substantially the same as or larger than the first threshold and smaller than a predetermined determined according to the edge level of image; and outputs the first output data and the edge flag of 1 if the difference is substantially the same as or larger than the second threshold. At this time, the color interpolation apparatus further has a sequent-processing unit performing the edge enhancement of the inputted 3×3 RGB data, respectively, by using the edge enhancement coefficient if the edge flag is 1. The subsequent-processing unit has a sign generating unit, determining and generating the sign of the edge enhancement coefficient; a subsequent-processing constant generating unit, determining a subsequent-processing constant according to the area of the pertinent value adding each of the inputted RGB data to the edge enhancement; a minimum generating unit, generating the minimum value of the RGB component of the subsequent-processing constants generated by the subsequent-processing constant generating unit; a generating unit, generating a new edge enhancement coefficient by using the data received from the sign generating unit and the minimum value generating unit; and an output unit, outputting the data, having the enhanced edge, of the inputted RGB data by using the new edge enhancement coefficient.

The removing unit has a third determining unit, determining the noise removing method of the image data according to the difference received from the color interpolation unit; a first filter unit, performing the filtering of the image data from the second determining unit; and a second filter unit, performing the zipper noise removing filtering of the image data received from the second determining unit.

The third determining unit determines to input the image data into the first filter unit and to perform the filtering if the difference is smaller than a predetermined third threshold determined according to the intensity level of illumination of image. The first filter unit can be a Gaussian filter.

Also, the third determining unit determines the value of the center element of the image data, received from the second determining unit, as the output if the difference is substantially the same as or larger than the third threshold and smaller than a predetermined fourth threshold determined according to the edge level of image, and the second determining unit determines to input the image data, received from the second determining unit, into the second filter unit and to perform the filtering if the difference is substantially the same as or larger than the fourth threshold.

The second filter unit has a first filter, determining the horizontal direction edge of the image data; a second filter, determining the vertical direction edge of the image data; a first detecting unit, detecting the absolute value abs_S1 of the sum of the elements of the output data of the first filter; a second detecting unit, detecting the absolute value abs_S2 of the sum of the elements of the output data of the second filter; a third calculating unit, calculating the sum abs_S of the output data of the first and second detecting units; and a processing unit, determining the pertinent output data according to the output data of the third calculating unit.

The processing unit determines output data as the value of the center element of the image data if the abs_S is smaller than a predetermined fifth threshold; determines the output data as the horizontal direction average of the center row, the center of which is added to the weight if the abs_S is larger than the fifth threshold and the abs_S1 is larger than a value adding the abs_S2 to a predetermined sixth threshold; determines the output data as the vertical direction average of the center column, the center of which is added to the weight if the abs_S is larger than the fifth threshold and the abs_S2 is larger than a value adding the abs_S1 to a predetermined sixth threshold; and determines the output data as the horizontal/vertical direction average of the center row/column, the centers of which are added to the weight if the abs_S is larger than the fifth threshold and the abs_S1 is smaller than the value adding the abs_S2 to the sixth threshold or the abs_S2 is smaller than the value adding the abs_S1 to the sixth threshold.

According to another embodiment of the present invention, the threshold determining apparatus can include a first determining unit, determining a standard deviation of noise for the image of the flat surface photographed with the maximum exposure and the minimum exposure, respectively; a second determining unit, determining the maximum value and the minimum value of the threshold by using the standard deviations of noise in the maximum exposure and the minimum exposure, respectively, determined by the first determining unit; and a third determining unit, determining the threshold by using the maximum value and the minimum value of the threshold, determined by the second determining unit, and the maximum exposure and the minimum exposure.

At this time, the second determining unit determines the maximum value of threshold by use of the following formula: $th_{max}=\sigma_{max\ exp}$ (where $th_{max}$ refers to the maximum value of threshold, and $\sigma_{max\ exp}$ refers to the standard deviation of noise in the maximum exposure), and the second determining unit determines the minimum value of threshold by use of the following formula: $th_{min}=\sigma_{min\ exp}$ (where $th_{min}$ refers to the minimum value of threshold, and $\sigma_{min\ exp}$ refers to the standard deviation of noise in the minimum exposure).

The third determining unit determines the threshold by use of the following formula:

$$th = \frac{th_{max} - th_{min}}{\text{Max Exposure} - \text{Min Exposure}} \cdot \text{Exposure} + \frac{\text{Max Exposure} \cdot th_{min} - \text{Min Expsoure} \cdot th_{max}}{\text{Max Exposure} - \text{Min Expsoure}}.$$

(where Max Exposure refers to the maximum exposure value, and Min Exposure refers to the minimum exposure value).

According to another embodiment of the present invention, the threshold determining apparatus can include a first determining unit, receiving the image of the flat surface photographed with the maximum exposure and the minimum exposure, respectively, and randomly acquiring samples from the mask, having a constant size, of the received image and calculating a first difference and a second difference, to calculate a first average of the first difference and a second average of the second difference, the first difference being the difference between the maximum value and the minimum value of noise in the maximum exposure, and the second difference being the difference between the maximum value and the minimum value of noise in the minimum exposure; a second determining unit, determining the maximum value and the minimum value of the threshold by using the average of the difference between the first average and the second average, calculated by the first determining unit; and a third determining unit, determining the threshold by using the maximum value and the minimum value of the threshold, determined by the second determining unit, and the maximum exposure and the minimum exposure.

The second determining unit determines the maximum value of threshold by the following formula: $th_{max}=\text{diff}_{max\ exp}$ (where $th_{max}$ refers to the maximum value of threshold, and $\text{diff}_{max\ exp}$ refers to the average value of the difference between the maximum value and the minimum value of noise in the maximum exposure), and the second determining unit determines the minimum value of threshold by the following formula: $th_{min}=\text{diff}_{min\ exp}$ (where $th_{min}$ refers to the minimum value of threshold, and $\text{diff}_{min\ exp}$ refers to the average value of the difference between the maximum value and the minimum value of noise in the minimum exposure).

The third determining unit determines the threshold by the following formula:

$$th = \frac{th_{max} - th_{min}}{\text{Max Exposure} - \text{Min Exposure}} \cdot \text{Exposure} + \frac{\text{Max Exposure} \cdot th_{min} - \text{Min Expsoure} \cdot th_{max}}{\text{Max Exposure} - \text{Min Expsoure}}$$

(where Max Exposure refers to the maximum exposure value, and Min Exposure refers to the minimum exposure value).

To achieve the above objects, another aspect of the present invention features the threshold determining method.

According to an embodiment of the present invention, the threshold determining method can include determining a standard deviation of noise for the image of the flat surface photographed with the maximum exposure and the minimum exposure, respectively; determining the maximum value and the minimum value of the threshold by using the standard deviations of noise in the maximum exposure and the minimum exposure, respectively, determined by the operation of determining the standard deviation of noise; and determining the threshold by using the maximum value and the minimum value of the threshold, determined by the operation of determining the maximum value and the minimum value of the threshold, and the maximum exposure and the minimum exposure.

According to another embodiment of the present invention, the threshold determining method can include receiving the image of the flat surface photographed with the maximum exposure and the minimum exposure, respectively, and randomly acquiring samples from the mask, having a uniform size, of the received image and calculating a first difference and a second difference, to calculate a first average of the first difference and a second average of the second difference, the first difference being the difference between the maximum value and the minimum value of noise in the maximum exposure, and the second difference being the difference between the maximum value and the minimum value of noise in the minimum exposure; determining the maximum value and the minimum value of the threshold by using the average of the difference between the first average and the second average, calculated by the operation of calculating the first average and the second average; and determining the threshold by using the maximum value and the minimum value of the threshold, determined by the operation of determining the maximum value and the minimum value of the threshold, and the maximum exposure and the minimum exposure.

BRIEF DESCRIPTION OF THE DRAWINGS

FIG. 4 is a simplified block diagram of a Bayer pattern image for illustrating the color interpolation performed by the interpolating unit of FIG. 3;

FIG. 5 is another simplified block diagram of a Bayer pattern image for illustrating the color interpolation performed by the interpolating unit of FIG. 3;

FIG. 6 is an example illustrating a first Gaussian filter and a second Gaussian filter of FIG. 3;

FIG. 16 and FIG. 17 are examples illustrating each of the first filter and the second filter of FIG. 15;

DETAILED DESCRIPTION

Figure 1:
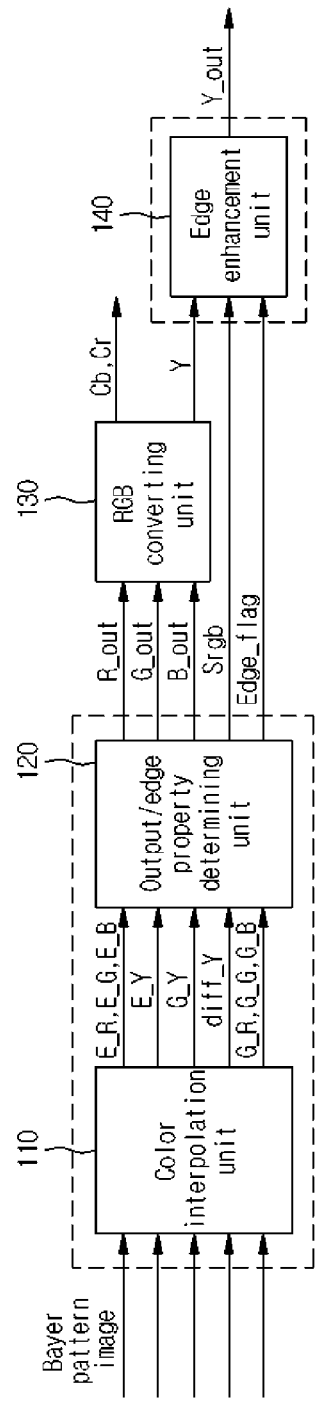
FIG. 1 is a simplified block diagram illustrating the operation of a color interpolation apparatus in accordance with a first embodiment of the present invention.

The above objects, features and advantages will become more apparent through the below description with reference to the accompanying drawings.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention. Throughout the drawings, similar elements are given similar reference numerals. Throughout the description of the present invention, when describing a certain technology is determined to evade the point of the present invention, the pertinent detailed description will be omitted.

Terms such as "first" and "second" can be used in describing various elements, but the above elements shall not be restricted to the above terms. The above terms are used only to distinguish one element from the other. For instance, the first element can be named the second element, and vice versa, without departing the scope of claims of the present invention. The term "and/or" shall include the combination of a plurality of listed items or any of the plurality of listed items.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Unless otherwise defined, all terms, including technical terms and scientific terms, used herein have the same meaning as how they are generally understood by those of ordinary skill in the art to which the invention pertains. Any term that is defined in a general dictionary shall be construed to have the same meaning in the context of the relevant art, and, unless otherwise defined explicitly, shall not be interpreted to have an idealistic or excessively formalistic meaning.

Hereinafter, preferred embodiments will be described in detail with reference to the accompanying drawings. Identical or corresponding elements will be given the same reference numerals, regardless of the figure number, and any redundant description of the identical or corresponding elements will not be repeated.

FIG. 1 is a simplified block diagram illustrating the color interpolation apparatus in accordance with a first embodiment of the present invention.

As illustrated of FIG. 1, the color interpolation apparatus of the present invention can include a color interpolation unit 110, an output/edge property determining unit 120, a RGB converting unit 130 and an edge enhancement unit 140.

The color interpolation unit 110 performs the color interpolation of an inputted Bayer pattern image. This will be described with reference to FIG. 3.

Figure 2:
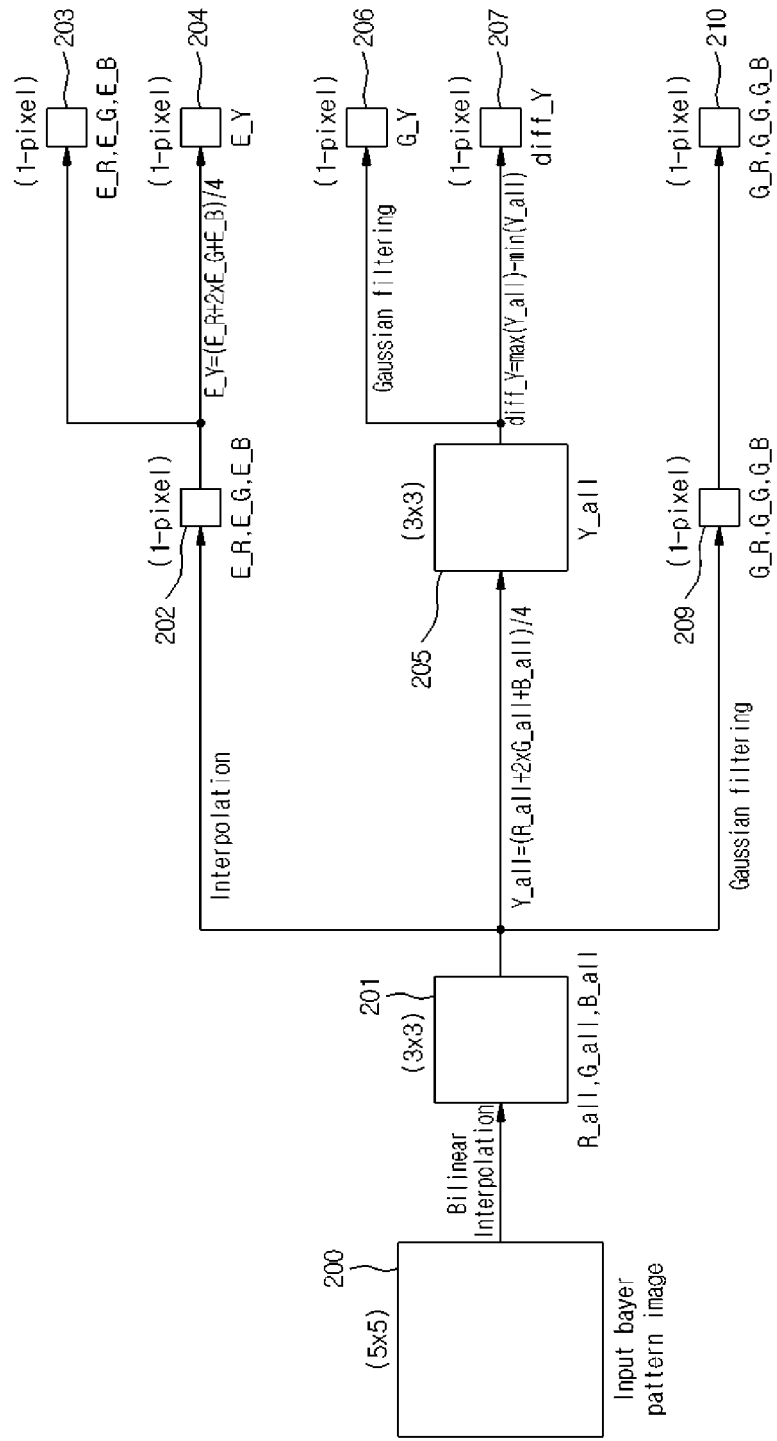
FIG. 2 is simplified block diagram illustrating the interpolation performed by the color interpolation unit of FIG. 1.

FIG. 2 is a simplified block diagram illustrating the interpolation performed by the color interpolation unit of FIG. 1.

As illustrated of FIG. 2, once a 5×5 Bayer pattern image 200 is inputted, the color interpolation unit 110 of the present invention performs the bilinear interpolation of the 5×5 Bayer pattern image 200 to obtain a 3×3 output image 201. The 3×3 output image 201 is referred to as R_all, G_all and B_all.

If the interpolation of the present invention (this will be described later) for the 3×3 output image 201 is first performed, 1-pixel data 202 will be taken. This 1-pixel data 202 becomes 1-pixel output data E_R, E_G and E_B 203. If the edge calculation of the 1-pixel data 202 is carried out, it will become 1-pixel output data E_Y 204.

If the edge calculation (this will be described later) of the 3×3 output image 201 is performed, a 3×3 image Y_all 205 will be taken. If the Gaussian filtering of the 3×3 image 205 is performed, a last 1-pixel output data G_Y 206 will be taken. On the other hand, if the special value (the difference between the maximum value and the minimum value) of the 3×3 image Y_all 205 is calculated, 1-pixel data diff_Y 207 will be taken.

Also, if the Gaussian filtering of the 3×3 image 201 is carried out, 1-pixel output data G_R, G_G and G_B, which becomes one output.

Accordingly, the color interpolation unit 110 can be inputted with the 5×5 Bayer pattern image 200 and output 5 1-pixel data 203, 204, 206, 207 and 210. Hereinafter, the detailed structure of the color interpolation unit 110 will be described with reference to FIG. 3.

Figure 3:
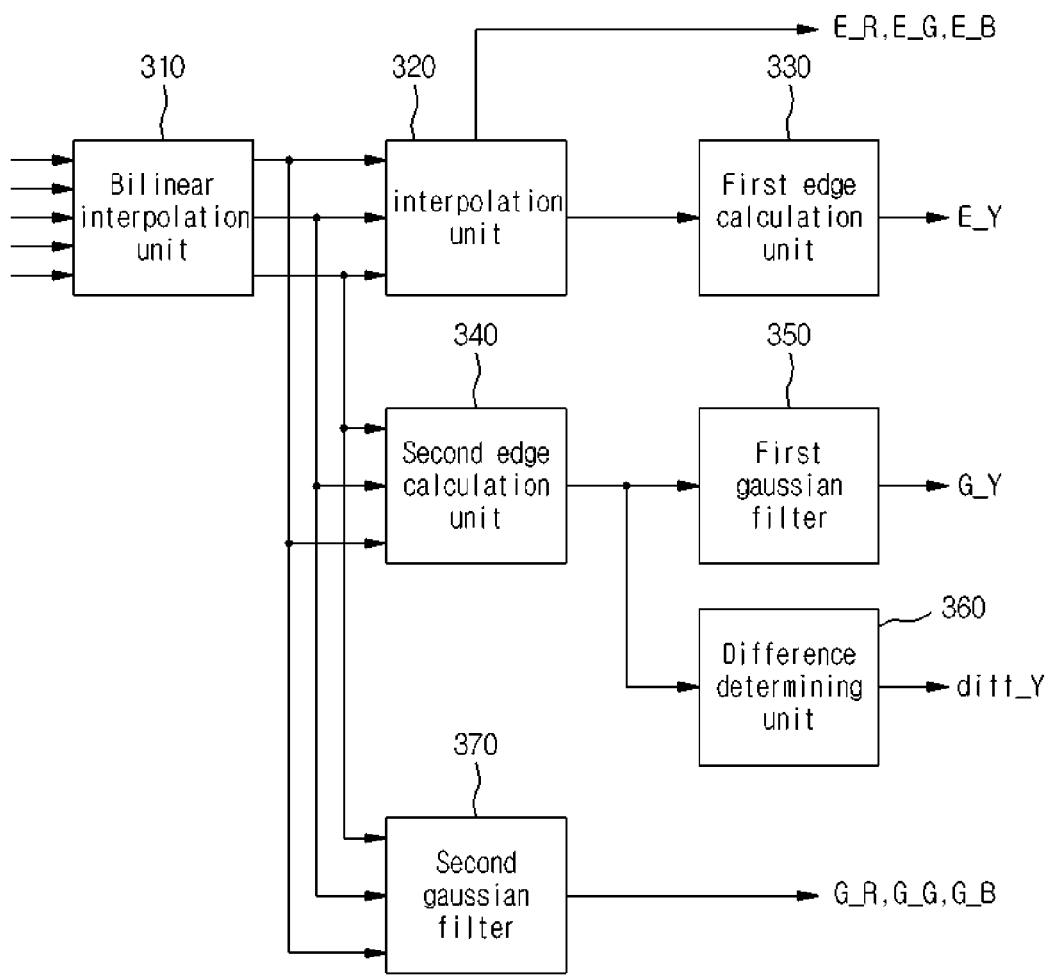
FIG. 3 is a detailed block diagram illustrating an embodiment of the color interpolation unit of FIG. 1.

FIG. 3 is a detailed block diagram illustrating an embodiment of the color interpolation unit of FIG. 1.

As illustrated of FIG. 3, the color interpolation unit 110 of the present invention can have a bilinear interpolation unit 310, an interpolation unit 320, a first edge calculation unit 330, a second edge calculation unit 340, a first Gaussian filter 350, a difference determining unit 360 and a second Gaussian filter 370.

The bilinear interpolation unit 310 performs the bilinear interpolation of an inputted 5×5 Bayer pattern image and outputs 3×3 data. Since this bilinear interpolation is the same as the already-known technology, the pertinent detailed description will be omitted.

The interpolation unit 320 performs the color interpolation of the inputted 3×3 data. This operation will be described with reference to the corresponding drawing.

FIG. 4 is a simplified block diagram of the Bayer pattern image for illustrating the color interpolation performed by the interpolating unit of FIG. 3 in case that the R3 of R component is a center pixel in an RG line. Referring to FIG. 4, the below description relates to the case that the R component is the center pixel. However, considering that the R component and B component exchange their locations with each other, the same description can be applied to the case that the center pixel is the B component in a GB line.

For the interpolation performed by the interpolation unit 320, Rn, Rw, Rs and Re and Kr1, Kr2, Kr3 and Kr4 of FIG. 4 are defined as the following formula 1 and formula 2, respectively.

$$Rn = \frac{R1 + R3}{2}$$ [Formula 1]

$$Rw = \frac{R2 + R3}{2}$$

$$Rs = \frac{R3 + R5}{2}$$

$$Re = \frac{R3 + R4}{2}$$

-continued $$Kr1 = G4 - Rn$$ [Formula 2]
$$Kr2 = G6 - Rw$$
$$Kr3 = G9 - Rs$$
$$Kr4 = G7 - Re$$

Then, the output E_G of the G component of the interpolation unit 320 is calculated by the following formula 3.

$$E\_G = R3 + \frac{Kr1 + Kr2 + Kr3 + Kr4}{4}$$ [Formula 3]

Since the interpolation method of the interpolation unit 320 is the same as the well-known prior art (e.g. Soo-Chang Pei, Fellow, IEEE, Io-Kuong Tam, "Effective Color Interpolation in CCD Color Filter Arrays Using Signal Correlation," IEEE transaction on circuits and systems for video technology, Vol. 13(6), June 2003), the pertinent detailed description will be omitted.

Gwn, Gws, Ges and Gen and Kb1, Kb2, Kb3 and K$_B$4 are defined as the following formula 4 and formula 5, respectively, to calculate the output E_B of the interpolated B component and the output E_R of the interpolated R component.

$$Gwn = \frac{G1 + G3 + G6 + G4}{4}$$ [Formula 4]

$$Gws = \frac{G6 + G8 + G11 + G9}{4}$$

$$Ges = \frac{G7 + G9 + G12 + G10}{4}$$

$$Gen = \frac{G2 + G4 + G7 + G5}{4}$$

$$Kb1 = Gwn - B1$$ [Formula 5]
$$Kb1 = Gwn - B1$$
$$Kb2 = Gen - B2$$
$$Kb3 = Gws - B3$$
$$Kb4 = Ges - B4$$

By the formula 4 and formula 5, the output E_B of the interpolated B component and the output E_R of the interpolated R component are determined by the formula 6 and the formula 7, respectively.

$$E\_B = E\_G - \frac{Kb1 + Kb2 + Kb3 + Kb4}{4}$$ [Formula 6]

$$E\_R = R3$$ [Formula 7]

On the other hand, FIG. 5 is another simplified block diagram of the Bayer pattern image for illustrating the color interpolation performed by the interpolating unit of FIG. 3 in case that the G5 of the G component is the center pixel in a GB line. Referring to FIG. 5, the below description relates to the case that the G component is the center pixel in the GB line. However, considering that the R component and a B component exchange their locations with each other in the Bayer pattern image, the same description can be applied to the case that the center pixel is the G component in the RB line.

Gn, Gw, Gs and Ge and Kr1, Kr2, Kb1 and Kb2 are defined as the following formula 8 and formula 9, respectively, to perform the color interpolation of the Bayer pattern image of FIG. 5.

$$Gn = \frac{G1 + G2 + G5 + G3}{4}$$ [Formula 8]

$$Gw = \frac{G2 + G4 + G7 + G5}{4}$$

$$Gs = \frac{G5 + G7 + G9 + G8}{4}$$

$$Ge = \frac{G3 + G5 + G8 + G6}{4}$$

$Kr1 = Gn - R1$ [Formula 9]
$Kr2 = Gs - R2$
$Kb1 = Gw - B1$
$Kb2 = Ge - B2$

By the formula 8 and formula 9, the outputs E_G, E_R and E_B are determined by the formula 10 through the formula 12, respectively in the case of FIG. 5.

$$E\_G = G5$$ [Formula 10]

$$E\_R = G5 - \frac{Kr1 + Kr2}{2}$$ [Formula 11]

$$E\_B = G5 - \frac{Kb1 + Kb2}{2}$$ [Formula 12]

In case the center pixel is the G component, the R component or the B component, each of the corresponding outputs is determined as described above.

The first edge calculating unit 330 performs the edge calculation of the outputs E_G, E_R and E_B of the interpolation 320. This edge calculation is represented as the following formula 13.

$$E\_Y = \frac{E\_R + 2 \times E\_G + E\_B}{4}$$ [Formula 13]

where E_Y is defined as the output data of the first edge calculating unit 330.

The second edge calculating unit 340, which receives 3×3 data from the bilinear interpolation unit 310, performs the edge calculation to carry out the edge detection of the 3×3 data. This edge calculation is the same as the following formula 14.

$$Y\_all = \frac{R\_all + 2 \times G\_all + B\_all}{4}$$ [Formula 14]

Figure 6:
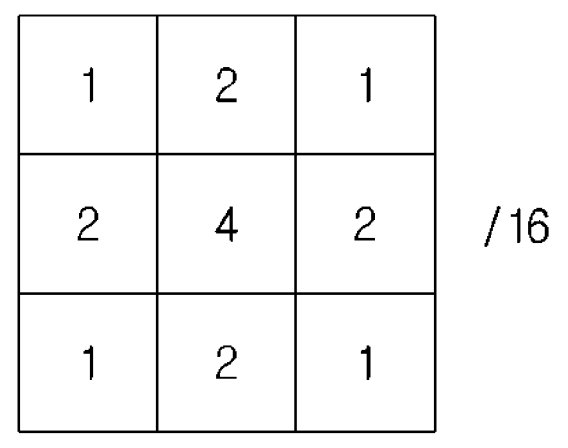

The 3×3 data Y_all is taken by calculating each pixel of the inputted 3×3 data by use of the formula 14. If the 3×3 data Y_all is passed through the first Gaussian filter 350, it becomes 1-pixel data G_Y. FIG. 6 is an example illustrating the first Gaussian filter and the second Gaussian filter of FIG. 3

The difference determining unit 360 determines the difference between the maximum value and the minimum value of elements in the 3×3 output data of the second edge calculating unit 340. This is represented by the following formula 15.

diff_Y=max(Y_all)−min(Y_all) [Formula 15]

Also, the second Gaussian filter 370 can take the output data G_R, G_G and G_B by Gaussian filtering the 3×3 output data of the bilinear interpolation unit 310.

As such, the output data of the color interpolation unit 110 of FIG. 1 is 1-pixel data E_R, E_G and E_B, 1-pixel data E_Y, 1-pixel data G_Y, 1-pixel data diff_Y and 1-pixel data G_R, G_G and G_B.

On the other hand, the output/edge property determining unit 120 receives the output data of the color interpolation unit 110 and an edge parameter, and determines not only RGB output data but also an edge enhancement coefficient and an edge flag.

The output/edge property determining unit 120 preset a first threshold thr1 and a second threshold thr2, which are determined and inputted in the previous system. These are varied depending on the system. The first threshold is determined depending on whether an image is flat. The second threshold is determined depending on the edge level.

In case that the difference diff_Y received from the color interpolation unit 110 is smaller than the first threshold, it is determined that the corresponding image is flat (e.g. a wall part) and the corresponding output is the output data of the second Gaussian filter 370. That is, this is represented by the following formula 16.

R_out=G_R

G_out=G_G

B_out=G_B [Formula 16]

If the difference diff_Y is the same as or larger than the first threshold and smaller than the second threshold, it is determined that the corresponding image has no edge and is not flat, that is, the image has properties such as an outline (e.g. at this time, referring to as a typical image). Also, the output/edge property determining unit 120 determines the corresponding output is the output data of the interpolation unit 320 and the corresponding edge flag is zero. In this case, the output is represented by the following formula 17.

R_out=E_R

G_out=E_G

B_out=E_B [Formula 17]

If the difference diff_Y is the same as or larger than the second threshold, it is determined that the corresponding image has an edge. Also, the output/edge property determining unit 120 determines the corresponding output is the output data of the interpolation unit 320 and the corresponding edge flag is 1.

The output/edge property determining unit 120 further generates an edge enhancement coefficient by using the inputted edge parameter. This edge parameter includes edge coring, edge gain and edge limit. This will be described with reference to FIG. 7 through FIG. 9.

Figure 7:
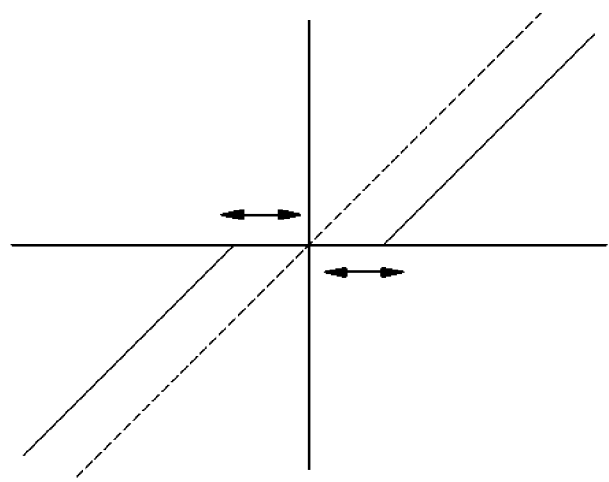
FIG. 7 through FIG. 9 are examples illustrating an edge parameter inputted into the output/edge property determining unit of FIG. 1.
Figure 8:
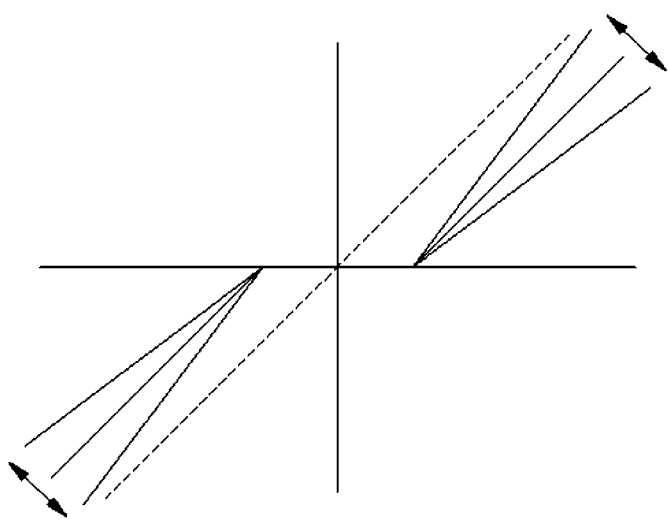
Figure 9:
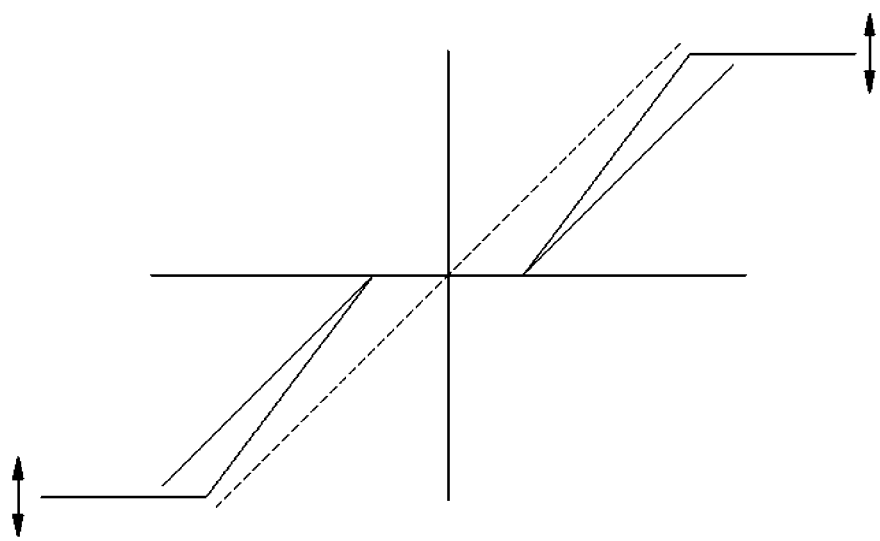

FIG. 7 through FIG. 9 are examples illustrating the edge parameter inputted into the output/edge property determining unit of FIG. 1.

The edge coring not only removes a noise-like edge component but also prevents small edge components from being displayed like the noise on a screen. As illustrated in FIG. 7, a predetermined value is subtracted from the inputted edge value, and the edge components under the value, inclusive, become zero.

As illustrated in FIG. 8, the edge gain is performed for the edge value passing through the edge coring. The difference between a large edge value and a small edge value is generated by changing the result value gradient of an outputted edge component to an inputted edge component. Accordingly, more clear and improved image quality is provided by making a clear edge component clearer and maintaining a small edge component unchangeable.

In case that the absolute value of the edge component, extracted from the edge gain operation, is very large, the edge limit restricts the maximum edge value to prevent the edge component having large absolute value from being specifically displayed on a screen. The edge limit has positive limit and negative limit.

The edge enhancement coefficient is determined by the edge parameter and the output data E_Y and G_Y, detected from the color interpolation unit 110. This is represented by the following formula 18.

$$Srgb = edge\_enhancement(edge\_component, edge\_parameter) \quad \text{[Formula 18]}$$

where Srgb is the edge enhancement coefficient and "edge_ component" is the difference between E_Y and G_Y. The edge enhancement coefficient is a function of the edge component and the edge parameter, referring to "edge_component," determined depending on the system. The edge enhancement coefficient value is not limited.

Accordingly, the output/edge property determining unit 120 outputs the data R_out, the G_out, B_out and the Srgb and the edge flag.

The RGB converting unit 130 receives the data R_out, G_out and B_out and converts the data R_out and B_out to luminance and chrominance YCbCr data. This is represented by the following formula 19.

$$\begin{pmatrix} Y \\ Cb \\ Cr \end{pmatrix} = \begin{pmatrix} 0.299 & 0.587 & 0.114 \\ -0.169 & -0.331 & 0.5 \\ 0.5 & -0.419 & -0.081 \end{pmatrix} \times \begin{pmatrix} R \\ G \\ B \end{pmatrix} - \begin{pmatrix} 0 \\ 128 \\ 128 \end{pmatrix} \quad \text{[Formula 19]}$$

However, since the formula of converting RGB data to YCbCr data is well known, the formula is not limited to the above formula 19. The converting ratio can be varied depending on the kind of the image processing system.

The edge enhancement unit 140 enhances the edge by using the luminance (Y) data, received from the above RGB converting unit 130 and the edge enhancement coefficient Srgb and the edge flag, received from the output/edge property determining unit 120.

If the edge flag is 1, the output data of the edge enhancement unit 140 is calculated by the following formula 20.

$$Y\_out = Y + Srgb \quad \text{[Formula 20]}$$

However, if the edge flag is zero, since it is determined that the corresponding image has no edge in the above, the output data of the edge enhancement unit 140 bypasses the inputted Y data.

Figure 10:
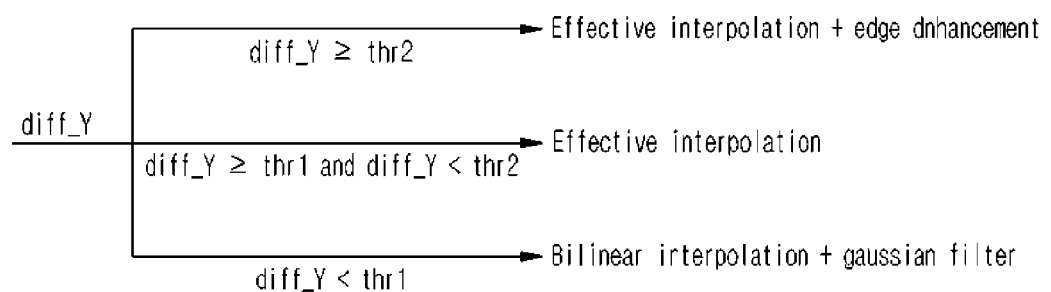
FIG. 10 is a simplified block diagram generally illustrating a color interpolation apparatus using an adjustable threshold in accordance with a first embodiment of the present invention.

FIG. 10 is a simplified block diagram generally illustrating the color interpolation apparatus using an adjustable threshold in accordance with a first embodiment of the present invention.

As illustrated in FIG. 10, the color interpolation apparatus of the present invention calculates the difference diff_Y. Then, if the difference diff_Y is smaller than the first threshold, the color interpolation apparatus performs the bilinear interpolation and Gaussian filtering. If the difference diff_Y is smaller than the second threshold and the same as or larger than the first threshold, the color interpolation apparatus performs the bilinear interpolation and the interpolation unit 320 of FIG. 3 performs the interpolation (referred to as "effective interpolation" in FIG. 10). Also, if the difference diff_Y is the same as or larger than the second threshold, the effective interpolation and the edge enhancement are performed.

Figure 11:
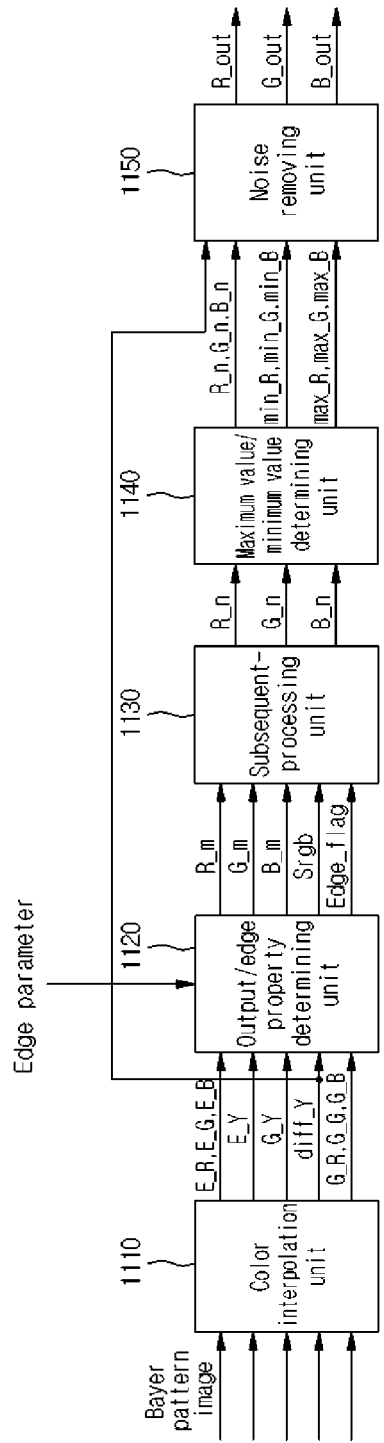
FIG. 11 is a block diagram illustrating a color interpolation apparatus using an adjustable threshold in accordance with a second embodiment of the present invention.

FIG. 11 is a block diagram illustrating the color interpolation apparatus using an adjustable threshold in accordance with a second embodiment of the present invention.

As illustrated in FIG. 11, the color interpolation apparatus of the present invention includes a color interpolation unit 1110, an output/edge property determining unit 1120, a subsequent-processing unit 1130, a maximum value/minimum value determining unit 1140 and a noise removing unit 1150.

The color interpolation unit 1110 performs the color interpolation of an inputted Bayer pattern image. This will be described with reference to the respective drawing.

Hereinafter, the method of the interpolation performed by the color interpolation unit 1110, illustrated in FIG. 11, will be described with reference to FIG. 2. The sizes of the Bayer pattern image and the output data, which are different from FIG. 2, are understandable through the below description. Further, for the convenience of description, although the same formula as mentioned in the first description of the first embodiment is used, a new reference number will be added to the same formula.

Once a 7×7 Bayer pattern image 200 is inputted, the color interpolation unit 1110 of the present invention performs the bilinear interpolation of the 7×7 Bayer pattern image 200 to take a 5×5 output image 201. The interpolation of this 5×5 output image 201 is performed to take 3×3 data 202. This 3×3 data 202 becomes 3×3 output data E_R, E_G and E_B 203. The edge calculation of the 3×3 data 202 is performed to take 3×3 output data E_Y 204.

Again, the edge calculation of the 5×5 output data 201 can be performed to take 5×5 data Y_all 205. The Gaussian filtering of the 5×5 data Y_all 205 can make 3×3 output data G_Y 206. Also, if the difference between the maximum value and the minimum value of elements of the data Y_all 205 is calculated, 1-pixel data diff_Y 207 can be taken.

Finally, the Gaussian filtering of the 5×5 output data 201 can be carried out to obtain 3×3 data G_R, G_G and G_B 210.

The color interpolation unit 1110 receives the 7×7 Bayer pattern image 200 and outputs 5 3×3 data 203, 204, 206, 207 and 210.

The structure of the color interpolation unit 1110 will be now described. The detailed block diagram of the color interpolation unit 1110 of FIG. 11 can be the same as described with reference to FIG. 3. The color interpolation 1110 can have a bilinear interpolation unit 310, an interpolation unit 320, a first edge calculation unit 330, a second edge calculation unit 340, a first Gaussian filter 350, a difference determining unit 360 and a second Gaussian filter 370. The function of each element, however, can be varied due to the size difference of the inputted Bayer pattern image.

Referring to FIG. 3, the bilinear interpolation unit 310 performs the bilinear interpolation of the inputted 7×7 Bayer pattern image and outputs 5×5 data.

The interpolation unit 320 performs the color interpolation of the inputted 5×5 data. This operation will be described with reference to the pertinent drawing.

As described above, FIG. 4 is the simplified block diagram of the Bayer pattern image for illustrating the color interpolation performed by the interpolating unit 320 in case that the R3 of R component is the center pixel in an RG line. Referring to FIG. 4, the below description relates to the case that the R component is the center pixel. However, the same description can be applied to the case that the center pixel is the B component in a GB line.

For the interpolation performed by the interpolation unit 320, Rn, Rw, Rs and Re and Kr1, Kr2, Kr3 and Kr4 of FIG. 4 are defined as the following formula 21 and formula 22, respectively.

$$Rn = \frac{R1 + R3}{2} \qquad \text{[Formula 21]}$$

$$Rw = \frac{R2 + R3}{2}$$

$$Rs = \frac{R3 + R5}{2}$$

$$Re = \frac{R3 + R4}{2}$$

$$Kr1 = G4 - Rn \qquad \text{[Formula 22]}$$
$$Kr2 = G6 - Rw$$
$$Kr3 = G9 - Rs$$
$$Kr4 = G7 - Re$$

Then, the output data of E_G the G component of the interpolation unit 320 is calculated by the following formula 23.

$$E\_G = R3 + \frac{Kr1 + Kr2 + Kr3 + Kr4}{4} \qquad \text{[Formula 23]}$$

Since the interpolation method of the interpolation unit 320 is the same as the well-known prior art (e.g. Soo-Chang Pei, Fellow, IEEE, Io-Kuong Tam, "Effective Color Interpolation in CCD Color Filter Arrays Using Signal Correlation", IEEE transaction on circuits and systems for video technology, Vol. 13(6), June 2003), the pertinent detailed description will be omitted.

Gwn, Gws, Ges and Gen and Kb1, Kb2, Kb3 and K$_B$4 are defined as the following formula 24 and formula 25, respectively, to calculate the output data E_B of the interpolated B component and the output data E_R of the interpolated R component.

$$Gwn = \frac{G1 + G3 + G6 + G4}{4} \qquad \text{[Formula 24]}$$

$$Gws = \frac{G6 + G8 + G11 + G9}{4}$$

$$Ges = \frac{G7 + G9 + G12 + G10}{4}$$

$$Gen = \frac{G2 + G4 + G7 + G5}{4}$$

$$Kb1 = Gwn - B1 \qquad \text{[Formula 25]}$$
$$Kb2 = Gen - B2$$
$$Kb3 = Gws - B3$$
$$Kb4 = Ges - B4$$

By the formula 24 and formula 25, the output E_B of the interpolated B component and the output E_R of the interpolated R component are determined by the formula 26 and the formula 27, respectively.

$$E\_B = E\_G - \frac{Kb1 + Kb2 + Kb3 + Kb4}{4} \qquad \text{[Formula 26]}$$

$$E\_R = R3 \qquad \text{[Formula 27]}$$

This interpolation is applied to a 5×5 matrix to output 3×3 output data E_R, E_G and E_B.

Also, as described below, FIG. 5 is another simplified block diagram of the Bayer pattern image for illustrating the color interpolation performed by the interpolating unit 320 in case that the G5 of G component is the center pixel in a GB line. Referring to FIG. 5, the below description relates to the case that the G component is the center pixel in the GB line. However, the same description can be applied to the case that the center pixel is the G component in an RB line.

Gn, Gw, Gs and Ge and Kr1, Kr2, Kb1 and Kb2 are defined as the following formula 28 and formula 29, respectively, to perform the color interpolation of the Bayer pattern image of FIG. 5.

$$Gn = \frac{G1 + G2 + G5 + G3}{4} \qquad \text{[Formula 28]}$$

$$Gw = \frac{G2 + G4 + G7 + G5}{4}$$

$$Gs = \frac{G5 + G7 + G9 + G8}{4}$$

$$Ge = \frac{G3 + G5 + G8 + G6}{4}$$

$$Kr1 = Gn - R1 \qquad \text{[Formula 29]}$$
$$Kr2 = Gs - R2$$
$$Kb1 = Gw - B1$$
$$Kb2 = Ge - B2$$

By the formula 28 and formula 29, the output data E_G, E_R and E_B are determined by the formula 30 through the formula 32, respectively in the case of FIG. 5.

$$E\_G = G5 \qquad \text{[Formula 30]}$$

$$E\_R = G5 - \frac{Kr1 + Kr2}{2} \qquad \text{[Formula 31]}$$

$$E\_B = G5 - \frac{Kb1 + Kb2}{2} \qquad \text{[Formula 32]}$$

In case the center pixel is the G component, the R component or the B component, each of the corresponding outputs is determined as described above. This interpolation is applied to a 5×5 matrix to output 3×3 output data E_R, E_G and E_B.

Figure 30:
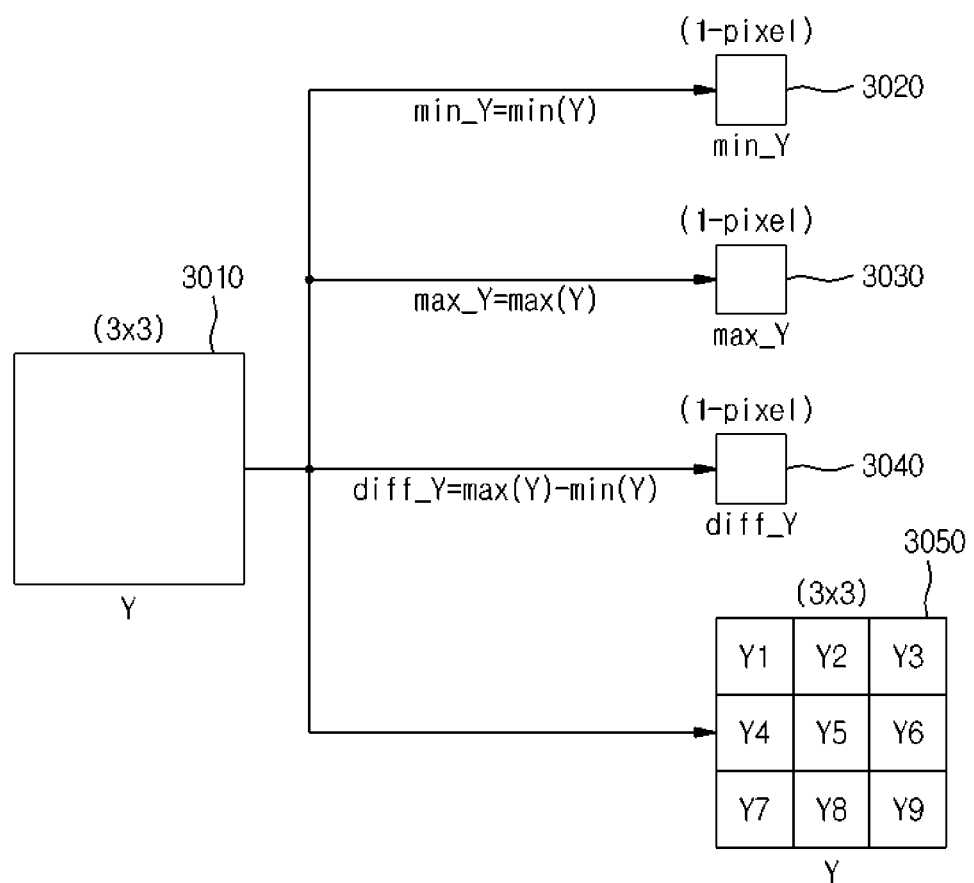
FIG. 30 is a conceptual diagram illustrating the operation of the difference calculating unit of FIG. 29.

The first edge calculating unit 330 of FIG. 30 performs the edge calculation of the output data E_G, E_R and E_B of the interpolation 320. This edge calculation is represented by the following formula 33.

$$E\_Y = \frac{E\_R + 2 \times E\_G + E\_B}{4} \qquad \text{[Formula 33]}$$

where E_Y is defined as the output data of the first edge calculating unit 330. The above calculation of each element forming the 3×3 data can be performed to take the 3×3 data E_Y.

The edge calculating unit, which receives 5×5 data from the bilinear interpolation unit 310, performs the edge calculation to carry out the edge detection of the 5×5 data. This edge calculation is the same as the following formula 34.

$$Y\_all = \frac{R\_all + 2 \times G\_all + B\_all}{4} \qquad \text{[Formula 34]}$$

The 5×5 data Y_all is taken by calculating each element of the inputted 5×5 data by use of the formula 34. If the 5×5 data Y_all is passed through the first Gaussian filter 350, it becomes 3×3 data G_Y.

The difference determining unit 360 determines the difference between the maximum value and the minimum value of the elements of the 5×5 output data of the second edge calculating unit 340. This is represented by the following formula 35.

$$\text{diff\_}Y = \max(Y\_\text{all}) - \min(Y\_\text{all}) \quad \text{[Formula 35]}$$

Also, in the color interpolation unit 1110 of the present invention, the second Gaussian filter 370 can take the 3×3 output data G_R, G_G and G_B by Gaussian filtering of the 5×5 output data of the bilinear interpolation unit 310.

As such, the output data of the color interpolation unit 1110 is 3×3 data E_R, E_G and E_B, 3×3 data E_Y and G_Y, 1-pixel data diff_Y and 3×3 data G_R, G_G and G_B.

On the other hand, the output/edge property determining unit 1120 receives the output data of the color interpolation unit 1110 and an edge parameter and determines not only the RGB output data but also an edge enhancement coefficient and an edge flag.

The output/edge property determining unit 1120 preset a first threshold thr1 and a second threshold thr2, which are determined and inputted in a previous system. These are varied depending on the system. The first threshold is determined depending on whether an image is flat. The second threshold is determined depending on the edge level.

In case that the difference diff_Y received from the color interpolation unit 1110 is smaller than the first threshold, it is determined that the corresponding image is flat (e.g. a wall part) and the corresponding output is the output data of the second Gaussian filter 370. That is, this is represented by the following formula 36.

$$R\_m = G\_R$$
$$G\_m = G\_G$$
$$B\_m = G\_B \quad \text{[Formula 36]}$$

If the difference diff_Y is the same as or larger than the first threshold and smaller than the second threshold, it is determined that the corresponding image has no edge and is not flat, that is, the image has properties such as an outline (e.g. at this time, referring to as a typical image). Also, the output/edge property determining unit 1120 determines the corresponding output is the output data of the interpolation unit 320 and the corresponding edge flag is zero. In this case, the output is represented by the following formula 37.

$$R\_m = E\_R$$
$$G\_m = E\_G$$
$$B\_m = E\_B \quad \text{[Formula 37]}$$

If the difference diff_Y is the same as or larger than the second threshold, it is determined that the corresponding image has an edge. Also, the output/edge property determining unit 1120 determines the corresponding output is the output data of the interpolation unit 320 and the corresponding edge flag is 1.

The output/edge property determining unit 1120 further generates an edge enhancement coefficient by using the inputted edge parameter. This edge parameter includes edge coring, edge gain and edge limit. The edge parameter will be described with reference to FIG. 7 through FIG. 9 in the description of the first embodiment. That is, referring to FIG. 7 through FIG. 9, the edge parameter inputted into the output/edge property determining unit 1120 will be described.

The edge coring not only removes a noise-like edge component also prevents small edge components from being displayed like noise on a screen. As illustrated in FIG. 7, a predetermined value is subtracted from the inputted edge value, and the edge components under the value, inclusive, become zero.

As illustrated in FIG. 8, the edge gain is performed for the edge value passing through the edge coring. The difference between a large edge value and a small edge value is generated by changing the result value gradient of an outputted edge component to an inputted edge component. Accordingly, more clear and improved image quality is provided by making a clear edge component clearer and maintaining a small edge component unchangeable.

In case that the absolute value of the edge component, extracted from the edge gain operation, is very large, the edge limit restricts the maximum edge value to prevent the edge component having large absolute value from being specifically displayed on a screen. The edge limit has positive limit and negative limit.

The edge enhancement coefficient is determined by the edge parameter and the output data E_Y and G_Y, detected from the color interpolation unit 110. This is represented by the following formula 38.

$$Srgb = \text{edge\_enhancement}(\text{edge\_component}, \text{edge\_parameter}) \quad \text{[Formula 38]}$$

where Srgb is the edge enhancement coefficient and "edge_ component" is the difference between E-Y and G_Y. The edge enhancement coefficient is a function of the edge component and the edge parameter, referring to "edge_component," determined depending on the system. The edge enhancement coefficient value is not limited. At this time, the edge enhancement coefficient also has the 3×3 size.

Accordingly, the output/edge property determining unit 1120 outputs the data R_m, the G_m, B_m and the Srgb and the edge flag.

The subsequent-processing part 1130 performs the edge enhancement of the inputted RGB data to prevent false color from being generated, in case that the edge flag is 1. In other words, in case that the flag outputted from the output/edge property determining unit 1120 is zero, the output data R_n, G_n and B_n of the subsequent-processing part 1130 is the same as the data R_m, G_m and B_m, that is, is bypassed.

Figure 12:
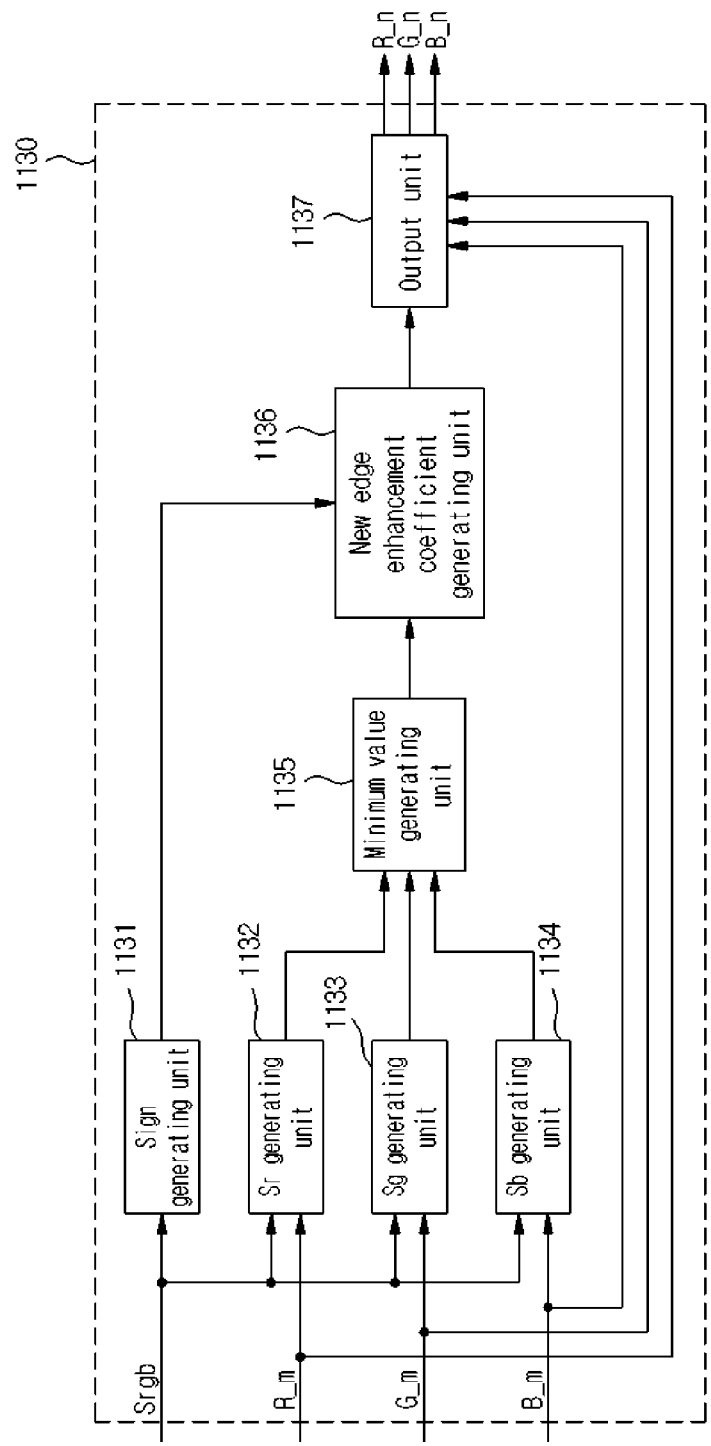
FIG. 12 is a detailed block diagram illustrating an embodiment of a subsequent-processing unit of FIG. 11.

FIG. 12 is a detailed block diagram illustrating an embodiment of the subsequent-processing unit of FIG. 11.

The subsequent-processing unit 1130 can include a sign generating unit 1131, a Sr generating unit 1132, a Sg generating unit 1133, a Sb generating unit 1134, a minimum value generating unit 1135, a new edge enhancement coefficient generating unit 1136 and an output unit 1137.

The sign generating unit 1131 determines and generates the sign of the inputted edge enhancement coefficient Srgb. This is represented by the following formula 39.

$$PN = \text{sign}(Srgb(i)) \quad \text{[Formula 39]}$$

where PN is the sign of the edge enhancement coefficient, and i represents that the sign of each element of the 3×3 data is generated. The below description is the same as this.

When the value of the inputted data R_m added to the edge enhancement coefficient Srgb is referred to as R1, (i.e. $R1 = R\_m(i) + Srgb(i)$, if the R1 is larger than a predetermined constant (e.g. 255), the Sr generating unit 1132 determines Sr by using the following formula 40; if the R1 is smaller than zero, the Sr generating unit 1132 determines Sr by using the following formula 41; and otherwise, the Sr generating unit 1132 determines Sr by using the following formula 42. At this time, the Sr refers to the subsequent-processing constant of the R component. If Sg and Sb similarly refer to the subsequent-processing constants of the G and B components, respectively, the same process can be applied to the Sg and Sb.

$$Sr=255-R\_m(i) \quad \text{[Formula 40]}$$

$$Sr=R\_m(i) \quad \text{[Formula 41]}$$

$$Sr=\text{abs}(Srgb(i)) \quad \text{[Formula 42]}$$

At this time, "abs" represents the absolute value, and the constant "255" is varied depending on each system. The constant is not limited to 255.

Similarly, when the value of the data G_m and B_m, respectively, added to the edge enhancement coefficient Srgb is referred to as G1 and B1, (i.e. G1=G_m(i)+Srgb(i) and B1=B_m(i)+Srgb(i)), if each of the G1 and B1 is larger than a predetermined constant (e.g. 255), the Sg generating unit 1133 and the Sb generating unit 134 determine Sg and Sb, respectively, by using the following formulas 43 and 46; if the R1 is smaller than zero, the Sg generating unit 1133 and the Sb generating unit 134 determine Sg and Sb, respectively, by using the following formulas 44 and 47; and otherwise, the Sg generating unit 1133 and the Sb generating unit 134 determine Sg and Sb, respectively, by using the following formulas 45 and 48.

$$Sg=255-G\_m(i) \quad \text{[Formula 43]}$$

$$Sg=G\_m(i) \quad \text{[Formula 44]}$$

$$Sg=\text{abs}(Srgb(i)) \quad \text{[Formula 45]}$$

$$Sb=255-B\_m(i) \quad \text{[Formula 46]}$$

$$Sb=B\_m(i) \quad \text{[Formula 47]}$$

$$Sb=\text{abs}(Srgb(i)) \quad \text{[Formula 48]}$$

Then, the minimum value generating unit 1135 generates the minimum value of the above subsequent-processing coefficients Sr, Sg and Sb, and the new enhancement coefficient generating unit 1136 generates a new edge enhancement coefficient by using this minimum value and the sign PN, received from the sign generating unit 1131. This is represented by the following formula 49.

$$\text{New\_Srgb}=PN\times\min([Sr,Sg,Sb]) \quad \text{[Formula 49]}$$

where New_Srgb is the new edge enhancement coefficient. By using the new edge enhancement coefficient, the output unit 1137 outputs output data having enhanced edge. The output data R_n, G_n and B_n of the RGB components outputted from the output unit 1137 are calculated by the following formulas 50 through 52, respectively.

$$R\_n(i)=R\_m(i)+\text{New\_Srgb} \quad \text{[Formula 50]}$$

$$G\_n(i)=G\_m(i)+\text{New\_Srgb} \quad \text{[Formula 51]}$$

$$B\_n(i)=B\_m(i)+\text{New\_Srgb} \quad \text{[Formula 52]}$$

Figure 13:
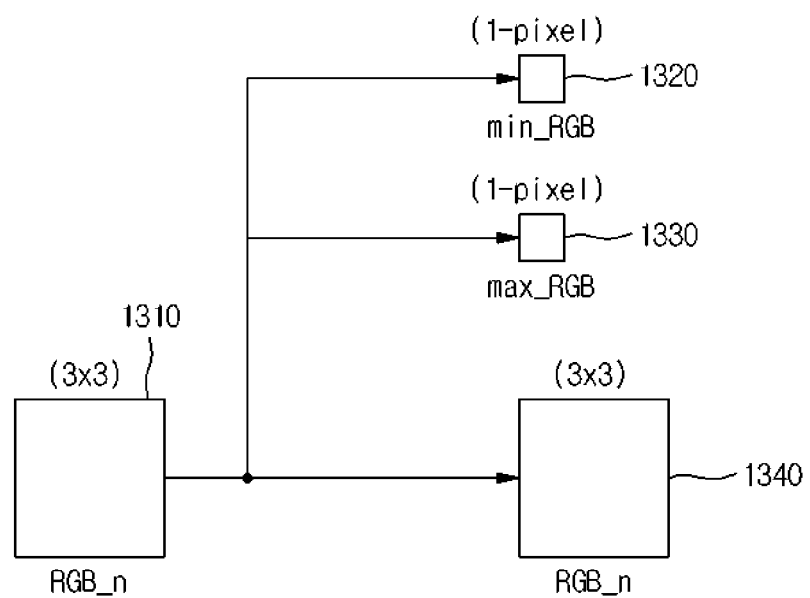
FIG. 13 is a conceptual diagram illustrating the operation of the maximum value /minimum value determining unit of FIG. 11.

Then, the maximum value/minimum value determining unit 1140 determines the maximum value and minimum value of each element of the inputted data R_n, G_n, and B_n. This is illustrated by FIG. 13. FIG. 13 is a conceptual diagram illustrating the operation of the maximum value/minimum value determining unit 1140 of FIG. 11.

The 3×3 data R_n, G_n and B_n inputted from the subsequent-processing unit 1130 refers to data RGB_n. Then, the maximum value/minimum value determining unit 1140 outputs the corresponding data RGB_n 1340 and the minimum value min_RGB 1320 and the maximum value max_RGB 1330 of the corresponding element. At this time, the min_RGB refers to min_R, min_G and min_B, and the max_RGB refers to max_R, max_G and max_B.

Then, the noise removing unit 1150 determines a noise removing method in accordance with the threshold and output the noise-removed data according to the determined noise removing method. This will be described with reference to the pertinent drawing.

Figure 14:
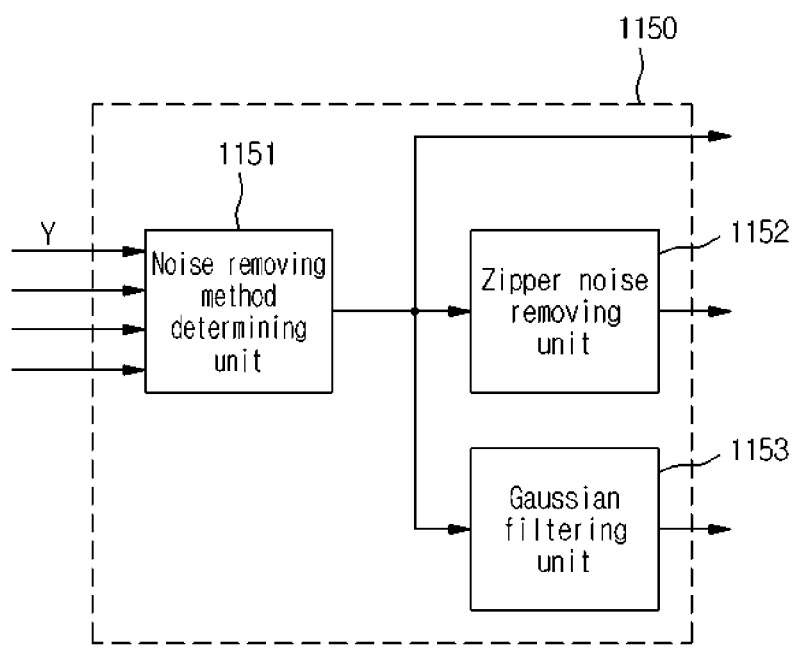
FIG. 14 is a detailed block diagram illustrating an embodiment of the noise removing unit of FIG. 11.

FIG. 14 is a detailed block diagram illustrating an embodiment of the noise removing unit 1150 of FIG. 11.

As illustrated in FIG. 14, the noise removing unit 1150 of FIG. 11 can have a noise removing method determining unit 1151, a zipper noise removing unit 1152 and a Gaussian filtering unit 1153.

The noise removing method determining unit 1151 preset a third threshold thr 3 and a fourth threshold thr 4, which are first determined and inputted from a previous system. These depend on the system. The third threshold is determined depending on whether the corresponding image is flat, and the fourth threshold is determined depending on the edge level.

In case that the difference diff_Y received from the color interpolation unit 1110 is smaller than the third threshold, the noise removing method determining unit 1151 determines that the corresponding image is flat (e.g. a wall part) and performs a typical filtering. In other words, the noise removing method determining unit 1151 determines to apply the Gaussian filter unit 1153 to remove the noise. The Gaussian filter unit 1153 performs the Gaussian filtering of this 3×3 RGB data.

An example of the Gaussian filter unit of FIG. 14 can be used by the same description in the first embodiment with reference to FIG. 6. However, it shall be evident that the present invention is not limited to the Gaussian filtering.

If the difference diff_Y is the same as or larger than the third threshold and smaller than the fourth threshold, the noise removing method determining unit 1151 determines that the corresponding image has no edge and is not flat, that is, the image has properties such as an outline (e.g. at this time, referring to as a typical image). Also, the noise removing method determining unit 1151 determines the output data R_out, G_out and B_out is the center element value of the data. That is, the noise removing method determining unit 1151 determines that the image of this area is not necessary to remove the noise.

If the difference diff_Y is the same as or larger than the fourth threshold, the noise removing method determining unit 1151 determines that the corresponding image has an edge and determines to perform the zipper noise removing. Accordingly, the zipper noise removing unit 1152 performs the zipper noise removing. This will be described with reference to the pertinent drawing.

Figure 15:
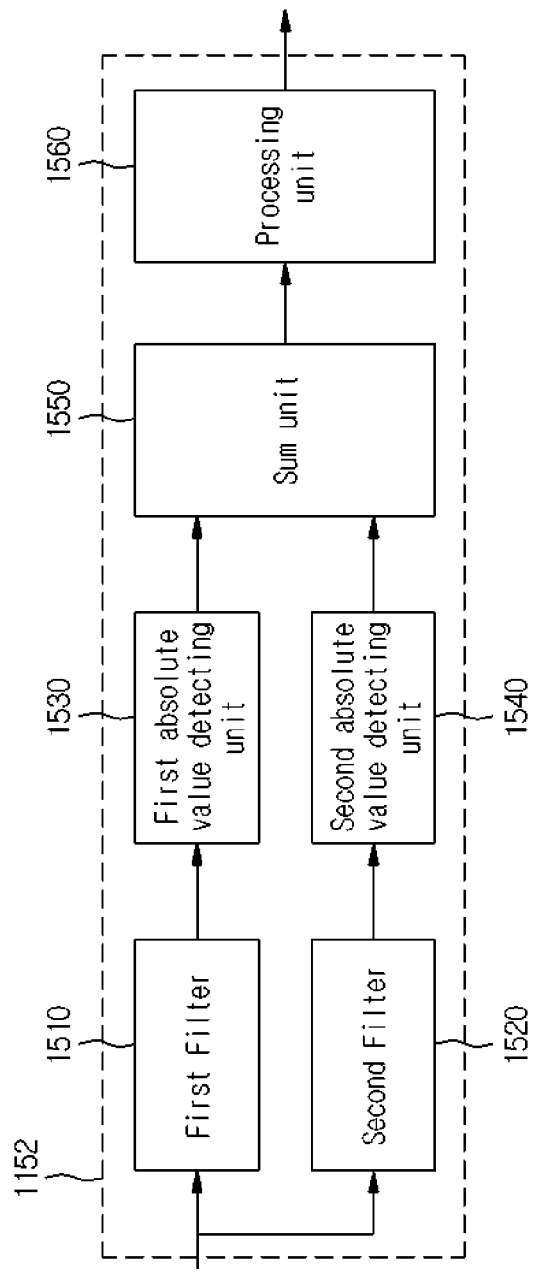
FIG. 15 is a detailed block diagram illustrating the zipper noise removing unit of FIG. 14.

FIG. 15 is a detailed block diagram illustrating the zipper noise removing unit 1152 of FIG. 14.

As illustrated in FIG. 15, the noise removing unit 1152 can include a first filter 1510, a second filter 1520, a first absolute value detecting unit 1530, and a second absolute value detecting unit 1540, a sum unit 1550 and a processing unit 1560.

Figure 16:
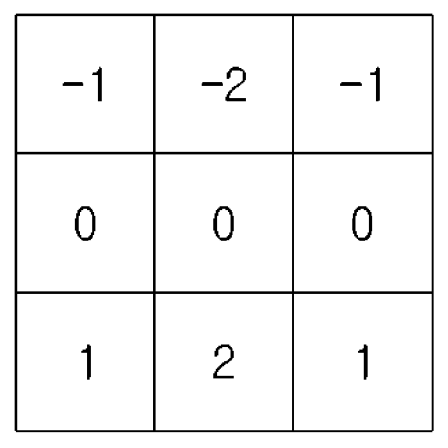
Figure 17:
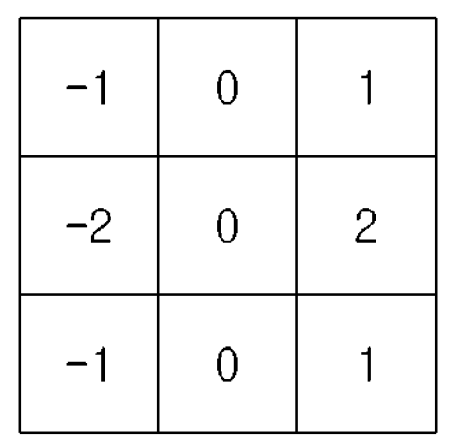
Figure 18:
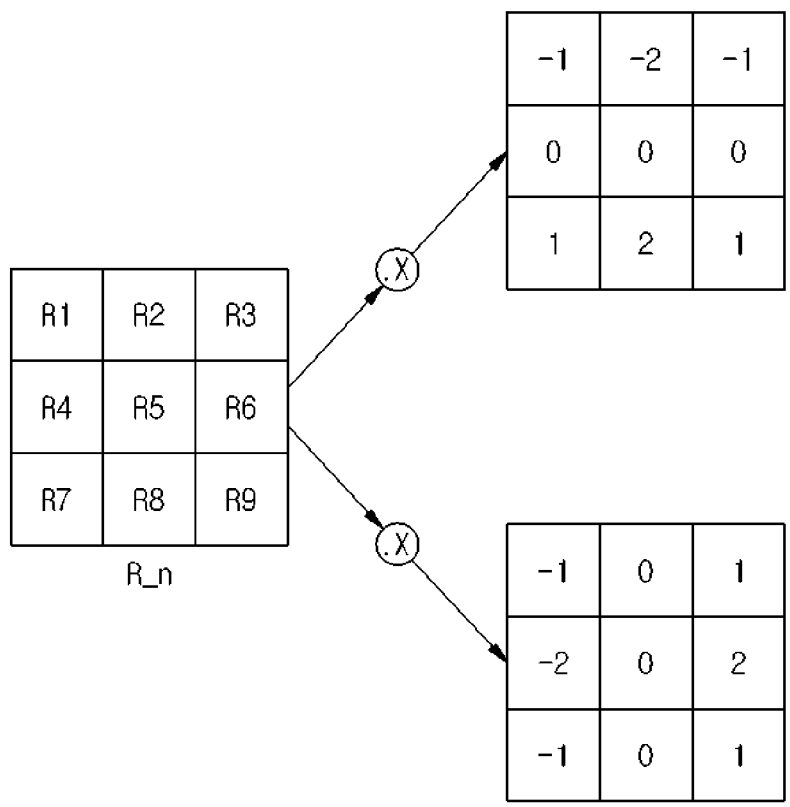
FIG. 18 is an example illustrating Data R_n inputted into the first filter of FIG. 16 and the second filter of FIG. 17.

The first and second filter 1510 and 1520, which can be a 3×3 filter, determines how many horizontal and vertical direction edge components of inputted RGB components are. For this, the inputted RGB components are also 3×3 data. FIG. 16 and FIG. 17 are examples illustrating the first filter and the second filter, respectively, of FIG. 15. FIG. 18 is an example illustrating Data R_n inputted into the first filter of FIG. 16 and the second filter of FIG. 17. However, although the illustration of FIG. 18 assumes that the data R_n is inputted into the first filter 1510 and the second filter 1520, the same illustration can be applied to the data G_n and B_n.

The first filter of FIG. 16 and the second filter of FIG. 17 are to determine the horizontal and vertical direction edge components of inputted data, respectively. Once the data R_n is inputted as illustrated in FIG. 18, elements are multiplied to each component at the same location. The symbol "×" of FIG. 18 refers to the multiplication of elements at the same position.

The first absolute value detecting unit 1530 sums the elements from the output data of the first filter 1510 and detects the absolute value of the sum of the elements. The output data of the first absolute value detecting unit 1530 is performed by the following formula 53.

$$abs\_S1 = abs(R7 + 2 \times R8 + R9 - R1 - 2 \times R2 - R3) \qquad \text{[Formula 53]}$$

where "abs" refers to the absolute value. The second absolute value detecting unit 1540 sums the elements from the output data of the second filter 1520 and detects the absolute value of the sum of the elements. The output data of the second absolute value detecting unit 1540 is performed by the following formula 54.

$$abs\_S2 = abs(R3 + 2 \times R6 + R9 - R1 - 2 \times R4 - R7) \qquad \text{[Formula 54]}$$

The sum unit 1550 calculates the sum abs_S of the output data of the first and second absolute detecting units 1530 and 1540. This is represented by the following formula 55.

$$abs\_S = abs\_S1 + abs\_S2 \qquad \text{[Formula 55]}$$

The processing unit 1560 outputs the data Rout filtered according to the output abs_S of the sum unit 1550. If the sum abs_S is larger than a predetermined fifth threshold, the processing unit 1560 recognizes there is an edge and determines whether the edge is the horizontal or vertical direction edge.

In other words, if abs_S1 is larger than a value adding abs_S2 to a predetermined sixth threshold, the processing unit 1560 determines the output Rout as the horizontal direction average of the center row, the center of which is added to the weight. In this case, the output Rout is calculated by the following formula 56.

$$Rout = \frac{R4 + 2 \times R5 + R6}{4} \qquad \text{[Formula 56]}$$

If the abs_S2 is larger than another value adding the abs_S1 to the sixth threshold, the processing unit 1560 determines the output Rout as the vertical direction average of the center column, the center of which is added to the weight. In this case, the output Rout is calculated by the following formula 57.

$$Rout = \frac{R2 + 2 \times R5 + R8}{4} \qquad \text{[Formula 57]}$$

Unless the abs_S1 is larger than the value adding the abs_S2 to the sixth threshold and the sum abs_S2 is larger than the value adding the abs_S1 to the sixth threshold when the sum abs_S is larger than the fifth threshold, the processing unit 1560 determines the output Rout as the horizontal/vertical direction averages of the center row/column, the centers of which are added to the weight. In this case, the output Rout is calculated by the following formula 58.

$$Rout = \frac{4 \times R5 + R2 + R4 + R6 + R8}{4} \qquad \text{[Formula 58]}$$

If the sum abs_S is smaller than the first threshold, the processing unit 1560 can recognize the corresponding image has no edge and determine the output Rout as R5, which is the value of the center element of the image.

Here, the firth threshold is variable. The sixth threshold can be determined as 50, but not limited thereto.

The above processes can be repeated for the data G_n and B_n to determine Gout and Bout.

Figure 19:
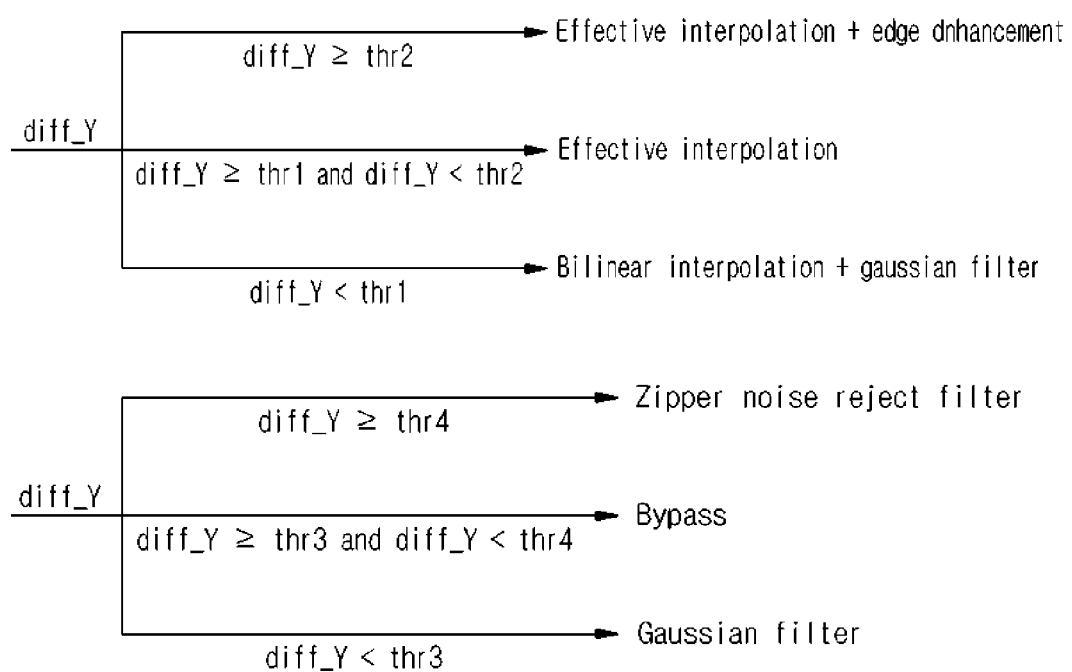
FIG. 19 is a simplified block diagram generally illustrating a color interpolation apparatus using an adjustable threshold in accordance with a second embodiment of the present invention.

FIG. 19 is a simplified block diagram generally illustrating the color interpolation apparatus using an adjustable threshold in accordance with a second embodiment of the present invention.

As illustrated in FIG. 19, the color interpolation apparatus of the present invention calculates the difference diff_Y. If the difference diff_Y is smaller than the first threshold, the color interpolation apparatus performs the bilinear interpolation and the Gaussian filtering. If the difference diff_Y is smaller than the second threshold and the same as or larger than the first threshold, the color interpolation apparatus performs the bilinear interpolation, and the interpolation unit 320 of FIG. 3 performs the interpolation (referred to as "effective interpolation" in FIG. 19). Also, if the difference diff_Y is the same as or larger than the second threshold, the color interpolation apparatus performs the effective interpolation and the edge enhancement.

On the other hand, the present invention calculates the difference diff_Y. If the difference diff_Y is smaller than the third threshold, the present invention performs the typical filtering such as the Gaussian filtering. If the difference diff_Y is smaller than the fourth threshold and the same as or larger than the third threshold, the present invention bypasses its performance. Also, if the difference diff_Y is the same as or larger than the fourth threshold, the present invention performs the zipper noise removing.

Figure 20:
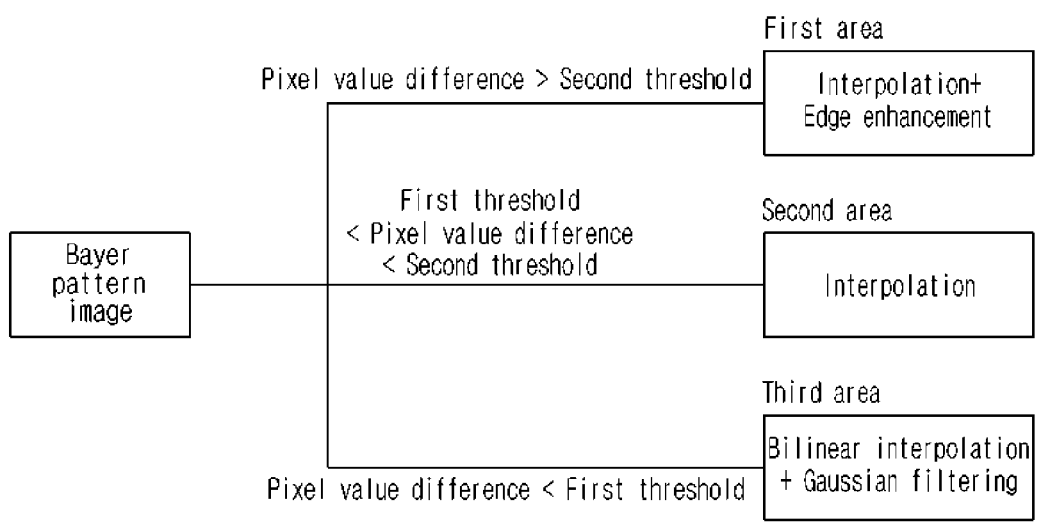
FIG. 20 is a simplified block diagram illustrating the color interpolation performed according to the threshold determined in accordance with a third embodiment of the present invention.

FIG. 20 is a simplified block diagram illustrating the color interpolation performed according to the threshold determined in accordance with a three embodiment of the present invention.

As illustrated in FIG. 20, in the color interpolation where the threshold is determined in accordance with the present invention, the different color interpolation methods according to the threshold are performed. This can be applied differently in accordance with the difference (the pixel value difference) between the maximum value and the minimum value of pixel, which is the property of image.

In FIG. 20, the second threshold is determined by the edge property of image. The method of determining whether the pixel value difference has the edge property has already been well-known. Accordingly, the method of setting the first threshold will be disclosed in the present invention.

In FIG. 20, the object of the third area is to remove a noise. Accordingly, the first threshold can be set depending on the noise. At this time, the luminance of the image against the illumination intensity of the external surroundings is typically determined by the camera exposure. This will be described with reference to the pertinent drawings.

Figure 21:
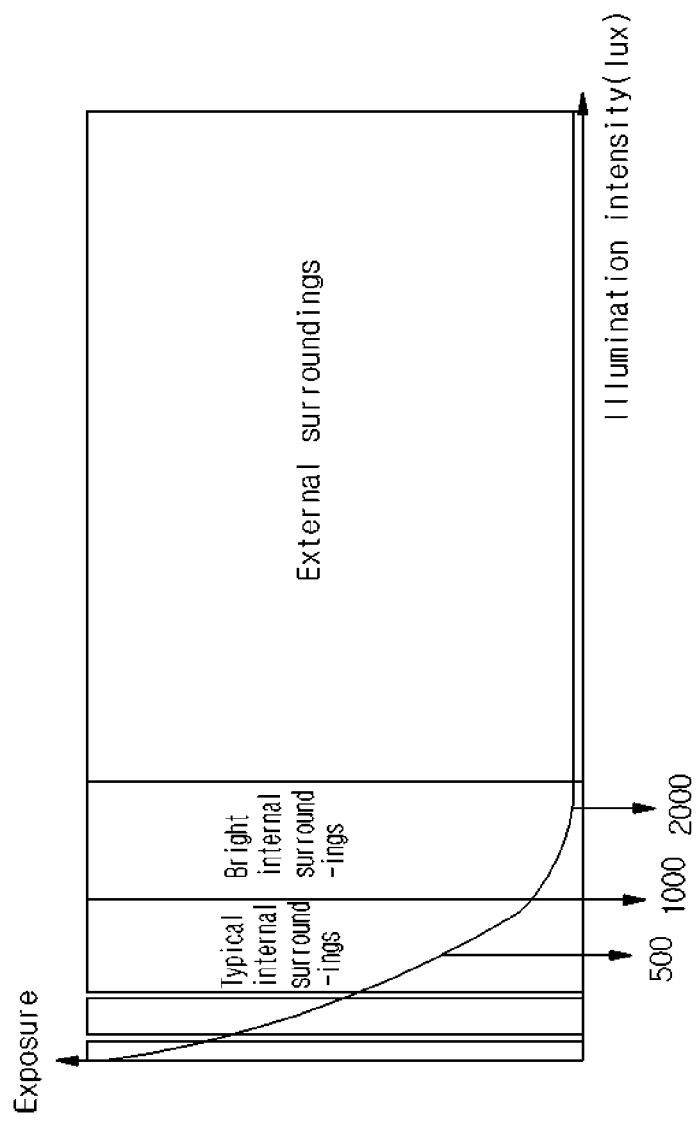
FIG. 21 illustrates a property curve of camera exposure depending on the surroundings.

FIG. 21 illustrates a property curve of camera exposure depending on the surroundings.

Figure 22:
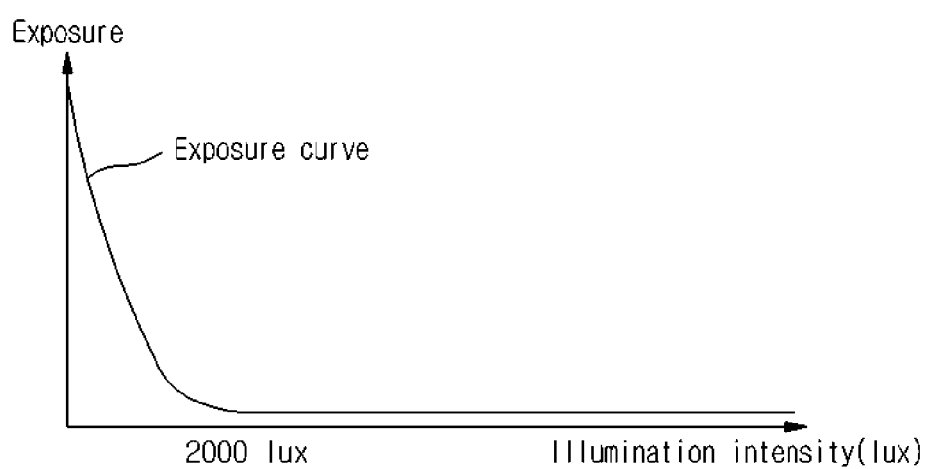
FIGS. 22 and 23 illustrate a property curve of the noise level of camera in accordance with the exposure.
Figure 23:
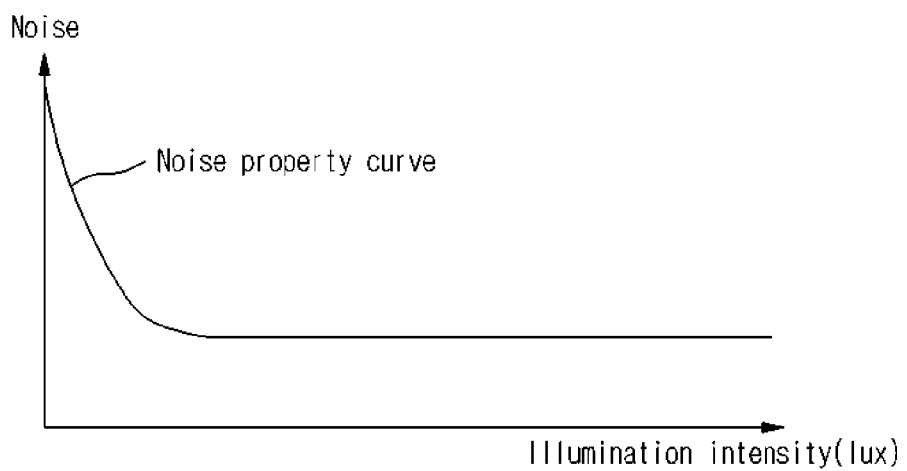

As illustrated in FIG. 21, the more changed from low to high the illumination intensity is, the smaller little by little the exposure level becomes. The high illumination of 2,000 lux or more maintains a constant amount of the exposure. The noise level of the image obtained from the camera is varied depending on the exposure level of this camera. FIGS. 22 and 23 illustrate a property curve of the noise level of camera in accordance with the exposure.

As illustrated in FIG. 22 and FIG. 23, it typically shows a tendency that the lower the intensity illumination is, the higher the noise level appears and the noise level is constantly maintained in a particular level of illumination intensity or more. Accordingly, the first threshold can be determined depending on the intensity level of illumination. At this time, since the illumination intensity corresponding to the external surroundings determines the exposure level of camera, the first threshold can be determined depending on the exposure level of camera. Hereinafter, "first threshold" will be referred to "threshold."

Figure 24:
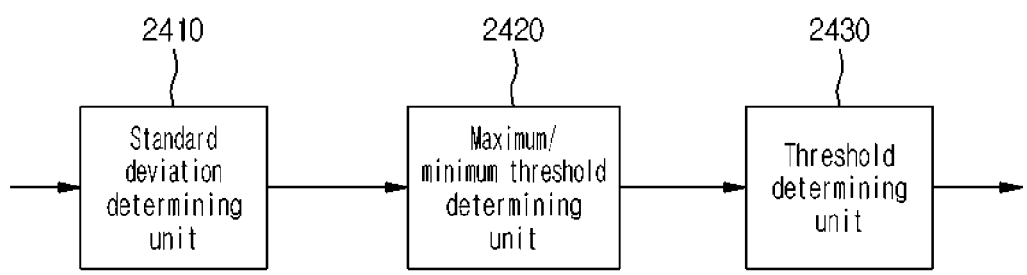
FIG. 24 is a block diagram illustrating a threshold determining apparatus in accordance with a third embodiment of the present invention.

FIG. 24 is a block diagram illustrating the threshold determining apparatus in accordance with the present invention.

As illustrated in FIG. 24, the threshold determining apparatus of the present invention can include a standard deviation determining unit 2410, a maximum/minimum threshold determining unit 2420 and a threshold determining unit 2430.

The standard deviation determining unit 2410 receives the image of the flat surface photographed with the maximum exposure and the minimum exposure, respectively, and calculates each of the standard deviations of noise. $\sigma_{max\ exp}$ refers to the standard deviation of noise in the maximum exposure. $\sigma_{min\ exp}$ refers to the standard deviation of noise in the minimum exposure.

The maximum/minimum threshold determining unit 2420 determines the maximum value and the minimum value of the threshold by using the standard deviations of noise in the maximum exposure and the minimum exposure, respectively, received from the aforementioned standard deviation determining unit 2410.

If the maximum value of the threshold refers to "$th_{max}$" and the minimum value of the threshold refers to "$th_{min}$," the $th_{max}$ and $th_{min}$ can be determined depending on the maximum noise and minimum noise, respectively. It is assumed that the maximum noise is generated in the maximum exposure and that the minimum noise is generated in the minimum exposure. Since the maximum/minimum noises can be calculated by the standard deviations of the maximum exposure and the minimum exposure, respectively, the $th_{max}$ and $th_{min}$ are represented by the following formulas 59 and 60, respectively.

$$th_{max} = \sigma_{max\ exp} \qquad \text{[Formula 59]}$$

$$th_{min} = \sigma_{min\ exp} \qquad \text{[Formula 60]}$$

If the noise level is high, the threshold must be increased to remove the noise in the third area of FIG. 20.

Figure 25:
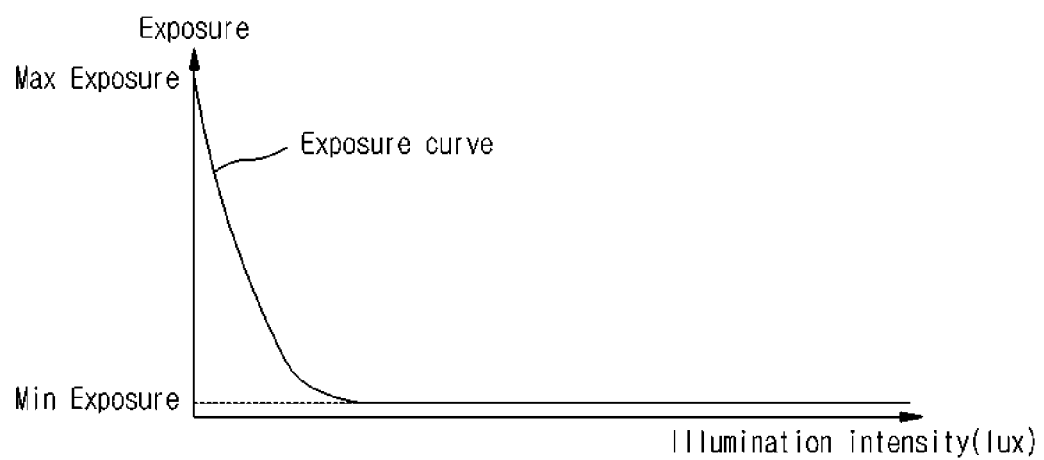
FIG. 25 illustrates a graph of the maximum value and minimum value of the exposure in accordance with the intensity of illumination.
Figure 26:
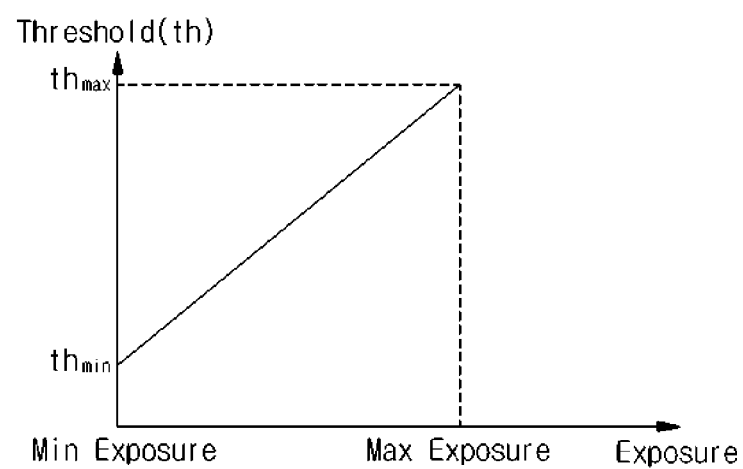
FIG. 26 illustrates a graph of the maximum value and minimum value of the threshold in accordance with the exposure.

FIG. 25 illustrates a graph of the maximum value and minimum value of the exposure in accordance with the intensity of illumination, and FIG. 26 illustrates a graph of the maximum value and minimum value of the threshold in accordance with the exposure.

As described above, a lot of noises mainly appear in the low intensity of illumination, and the low intensity of illumination has the high exposure value as illustrated in FIG. 25. Accordingly, a threshold th is set at a maximum assuming that there are most noises in the maximum exposure value Max Exposure. Also, the $th_{min}$, which is the minimum of the threshold th, is set in the minimum exposure value Min Exposure, where the exposure is constantly maintained at a particular intensity level of illumination. In the internal area, the threshold having linear properties can be formed. Accordingly, in accordance with the graph property of FIG. 26, the threshold determining unit 2430 can calculate the threshold th depending on the exposure by the following formula 61.

$$th = \frac{th_{max} - th_{min}}{\text{Max Exposure} - \text{Min Exposure}} \cdot \text{Exposure} + \frac{\text{Max Exposure} \cdot th_{min} - \text{Min Exposure} \cdot th_{max}}{\text{Max Exposure} - \text{Min Exposure}} \qquad \text{[Formula 61]}$$

The color interpolation can be performed by using the threshold determined by the above formula 61.

Hereinafter, the threshold calculated by the formula 61 refers to "first threshold." The method of performing the color interpolation by use of a second threshold, determined depending on the aforementioned edge level, will be described with reference to FIG. 1 through FIG. 9, which was referred while the first embodiment was described. Further, for the convenience of description, although the same formula, as described in the first embodiment, is used in the description, a new reference number will be added to the same formula.

Referring to FIG. 1 where illustrates the block diagram of the color interpolation apparatus applied with the determined threshold, the color interpolation apparatus of the present invention can include the color interpolation unit 110, the output/edge property determining unit 120, the RGB converting unit 130 and the edge enhancement unit 140.

The color interpolation unit 110 performs the color interpolation of an inputted Bayer pattern image. FIG. 2 is the simplified block diagram illustrating the interpolation performed by the color interpolation unit of FIG. 1.

As illustrated of FIG. 2, once a 5×5 Bayer pattern image 700 is inputted, the color interpolation unit 110 of the present invention performs the bilinear interpolation of the 5×5 Bayer pattern image 200 to take a 3×3 output image 201. This 3×3 output image 201 is referred to as R_all, G_all and B_all.

If the interpolation of the present invention for the 3×3 output image 201 is first performed, 1-pixel data 202 will be taken. This 1-pixel data 202 becomes 1-pixel output data E_R, E_G and E_B 203. If the edge calculation of the 1-pixel data 202 is carried out, it will become 1-pixel output data E_Y 204.

If the edge calculation of the 3×3 output image 201 is performed again, a 3×3 image Y_all 205 will be taken. If the Gaussian filtering of the 3×3 image Y_all 205 is performed, last 1-pixel output data G_Y 206 will be taken. On the other hand, if the special value (the difference between the maximum value and the minimum value) of the 3×3 image Y_all 205 is calculated, 1-pixel data diff_Y 207 will be taken.

Also, if the Gaussian filtering of the 3×3 image 201 is carried out, 1-pixel output data G_R, G_G and G_B will be obtained, which is one output.

Accordingly, the color interpolation unit 110 can be inputted with the 5×5 Bayer pattern image 200 and output five 1-pixel data 203, 204, 206, 207 and 210.

FIG. 3 is a detailed block diagram illustrating an embodiment of the color interpolation unit of FIG. 1. As illustrated of FIG. 3, the color interpolation unit 110 of the present invention can have the bilinear interpolation unit 310, the interpolation unit 320, the first edge calculation unit 330, the second edge calculation unit 340, the first Gaussian filter 350, the difference determining unit 360 and the second Gaussian filter 370.

The bilinear interpolation unit 310 performs the bilinear interpolation of an inputted 5×5 Bayer pattern image and outputs 3×3 data.

The interpolation unit 320 performs the color interpolation of the inputted 3×3 data. FIG. 4 illustrates the Bayer pattern image for the color interpolation performed by the interpolating unit 320. Referring to FIG. 4, the below description relates to the case that the R3 of the R component is the center pixel in an RG line. However, the same description can be applied to the case that the center pixel is the B component in a GB line.

For the interpolation performed by the interpolation unit 320, Rn, Rw, Rs and Re and Kr1, Kr2, Kr3 and Kr4 of FIG. 4 are defined as the following formula 62 and formula 63, respectively.

$$Rn = \frac{R1 + R3}{2}$$ [Formula 62]
$$Rw = \frac{R2 + R3}{2}$$
$$Rs = \frac{R3 + R5}{2}$$
$$Re = \frac{R3 + R4}{2}$$

$$Kr1 = G4 - Rn$$ [Formula 63]
$$Kr2 = G6 - Rw$$
$$Kr3 = G9 - Rs$$
$$Kr4 = G7 - Re$$

Then, the output data E_G of the G component of the interpolation unit 320 is the following formula 64.

$$E\_G = R3 + \frac{Kr1 + Kr2 + Kr3 + Kr4}{4}$$ [Formula 64]

Since the interpolation method of the interpolation unit 320 is the same as the well-known prior art, the pertinent detailed description will be omitted.

Gwn, Gws, Ges and Gen and Kb1, Kb2, Kb3 and K$_B$4 are defined as the following formula 65 and formula 66, respectively, to calculate the output data E_B of the interpolated B component and the output data E_R of the interpolated R component.

$$Gwn = \frac{G1 + G3 + G6 + G4}{4}$$ [Formula 65]
$$Gws = \frac{G6 + G8 + G11 + G9}{4}$$
$$Ges = \frac{G7 + G9 + G12 + G10}{4}$$
$$Gen = \frac{G2 + G4 + G7 + G5}{4}$$

$$Kb1 = Gwn - B1$$ [Formula 66]
$$Kb2 = Gen - B2$$
$$Kb3 = Gws - B3$$
$$Kb4 = Ges - B4$$

By the formula 65 and formula 66, the output data E_B of the interpolated B component and the output data E_R of the interpolated R component are determined by the formula 67 and the formula 68, respectively.

$$E\_B = E\_G - \frac{Kb1 + Kb2 + Kb3 + Kb4}{4}$$ [Formula 67]

$$E\_R = R3$$ [Formula 68]

On the other hand, FIG. 5 is another simplified block diagram of the Bayer pattern image illustrating the color interpolation performed by the interpolating unit 320 of FIG. 3 in case that the G5 of G component is the center pixel in a GB line. The below description relates to the case that the G component is the center pixel in the GB line. However, the same description can be applied to the case that the center pixel is the G component in an RB line.

Gn, Gw, Gs and Ge and Kr1, Kr2, Kb1 and Kb2 are defined as the following formula 69 and formula 70, respectively, to perform the color interpolation of the Bayer pattern image of FIG. 5.

$$Gn = \frac{G1 + G2 + G5 + G3}{4}$$ [Formula 69]
$$Gw = \frac{G2 + G4 + G7 + G5}{4}$$
$$Gs = \frac{G5 + G7 + G9 + G8}{4}$$
$$Ge = \frac{G3 + G5 + G7 + G6}{4}$$

$$Kr1 = Gn - R1$$ [Formula 70]
$$Kr2 = Gs - R2$$
$$Kb1 = Gw - B1$$
$$Kb2 = Ge - B2$$

By the formula 69 and formula 70, the output data E_G, E_R and E_B are determined by the formula 71 through the formula 73, respectively in the case of FIG. 5.

$$E\_G = G5$$ [Formula 71]

$$E\_R = G5 - \frac{Kr1 + Kr2}{2}$$ [Formula 72]

$$E\_B = G5 - \frac{Kb1 + Kb2}{2}$$ [Formula 73]

In case the center pixel is the G component, the R component or the B component, each of the corresponding output data is determined as described above.

The first edge calculating unit 330 performs the edge calculation of the output data E_G, E_R and E_B of the interpolation unit 320. This edge calculation is represented by the following formula 74.

$$E\_Y = \frac{E\_R + 2 \times E\_G + E\_B}{4}$$ [Formula 74]

where E_Y is defined as the output data of the first edge calculating unit 330.

The second edge calculating unit 340, which receives 3×3 data from the bilinear interpolation unit 310, performs the edge calculation to carry out the edge detection of the 3×3 data. This edge calculation is the same as the following formula 75.

$$Y\_all = \frac{R\_all + 2 \times G\_all + B\_all}{4} \quad \text{[Formula 75]}$$

The 3×3 data Y_all is taken by calculating each pixel of the inputted 3×3 data by use of the formula 75. If the 3×3 data Y_all is passed through the first Gaussian filter 350, it becomes 1-pixel data G_Y. FIG. 6 is an example illustrating the first Gaussian filter and the second Gaussian filter of FIG. 3.

The difference determining unit 360 determines the difference between the maximum value and the minimum value of the elements of the 3×3 output data of the second edge calculating unit 340. This is represented by the following formula 76.

diff_Y=max(Y_all)−min(Y_all) [Formula 76]

Also, the second Gaussian filter 370 can take the output data G_R, G_G and G_B by Gaussian filtering the 3×3 output data of the bilinear interpolation unit 310.

As such, the output data of the color interpolation unit 110 of FIG. 1 is 1-pixel data E_R, E_G and E_B, 1-pixel data E_Y, 1-pixel data G_Y, 1-pixel data diff_Y and 1-pixel data G_R, G_G and G_B.

On the other hand, the output/edge property determining unit 120 receives the output data of the color interpolation unit 110 and an edge parameter, and determines not only the RGB output but also an edge enhancement coefficient and an edge flag.

In accordance with the present invention, the output/edge property determining unit 120 presets a first threshold, determined by the formula 61, and a second threshold, determined depending on the edge property. These are varied depending on the system.

In case that the difference diff_Y received from the color interpolation unit 110 is smaller than the first threshold, it is determined that the corresponding image is flat (e.g. a wall part) and the corresponding output is the output data of the second Gaussian filter 370. That is, this is represented by the following formula 77.

R_out=G_R

G_out=G_G

B_out=G_B [Formula 77]

If the difference diff_Y is the same as or larger than the first threshold and smaller than the second threshold, it is determined that the corresponding image has no edge and is not flat, that is, the image has properties such as an outline (e.g. at this time, referring to as a typical image). Also, the output/edge property determining unit 120 determines the corresponding output is the output data of the interpolation unit 320 and the corresponding edge flag is zero. In this case, the output is represented by the following formula 78.

R_out=E_R

G_out=E_G

B_out=E_B [Formula 78]

If the difference diff_Y is the same as or larger than the second threshold, it is determined that the corresponding image has an edge. Also, the output/edge property determining unit 120 determines the corresponding output is the output data of the interpolation unit 320 and the corresponding edge flag is 1.

The output/edge property determining unit 120 further generates an edge enhancement coefficient by using the inputted edge parameter. This edge parameter includes edge coring, edge gain and edge limit. The edge parameter will be described with reference to FIG. 7 through FIG. 9.

FIG. 7 through FIG. 9 are examples illustrating the edge parameter inputted into the output/edge property determining unit 120.

The edge coring not only removes a noise-like edge component also prevents small edge components from being displayed like noise on a screen. As illustrated in FIG. 7, a predetermined value is subtracted from the inputted edge value, and the edge components under the value, inclusive, become zero.

As illustrated in FIG. 8, the edge gain is performed the edge value passing through the edge coring. The difference between a large edge value and a small edge value is generated by changing the result value gradient of an outputted edge component to an inputted edge component. Accordingly, more clear and improved image quality is provided by making a clear edge component clearer and maintaining a small edge component unchangeable.

In case that the absolute value of the edge component, extracted from the edge gain operation, is very large, the edge limit restricts the maximum edge value to prevent the edge component having large absolute value from being specifically displayed on a screen. The edge limit has positive limit and negative limit.

The edge enhancement coefficient is determined by the edge parameter and the outputs E_Y and G_Y, detected from the color interpolation unit 110. This is represented by the following formula 79.

Srgb=edge_enhancement(edge_component, edge_parameter) [Formula 79]

where Srgb refers to the edge enhancement coefficient and "edge_component" refers to the difference between E_Y and G_Y. The edge enhancement coefficient is a function of the edge component and the edge parameter, referring to "edge_component," determined depending on the system. The edge enhancement coefficient value is not limited.

Accordingly, the output/edge property determining unit 120 outputs the data R_out, the G_out, B_out and the Srgb and the edge flag.

The RGB converting unit 130 receives the data R_out, G_out and B_out and converts the data R_out and B_out to luminance and chrominance YCbCr data. This is represented by the following formula 80.

$$\begin{pmatrix} Y \\ Cb \\ Cr \end{pmatrix} = \begin{pmatrix} 0.299 & 0.587 & 0.114 \\ -0.169 & -0.331 & 0.5 \\ 0.5 & -0.419 & -0.081 \end{pmatrix} \times \begin{pmatrix} R \\ G \\ B \end{pmatrix} - \begin{pmatrix} 0 \\ 128 \\ 128 \end{pmatrix} \quad \text{[Formula 80]}$$

However, since the formula of converting RGB data to YCbCr data is well known, the formula is limited to the above formula 19. The converting ratio can be varied depending on the kind of the image processing system.

The edge enhancement unit 140 enhances the edge by using the luminance (Y) data, received from the above RGB converting unit 130, the edge enhancement coefficient Srgb, received from the output/edge property determining unit 120, and the edge flag.

If the edge flag is 1, the output data of the edge enhancement 140 is calculated by the following formula 20.

Y_out=Y+Srgb [Formula 81]

However, if the edge flag is zero, since it is determined that the corresponding image has no edge in the above, the output data of the edge enhancement 140 bypasses the Y data.

Figure 27:
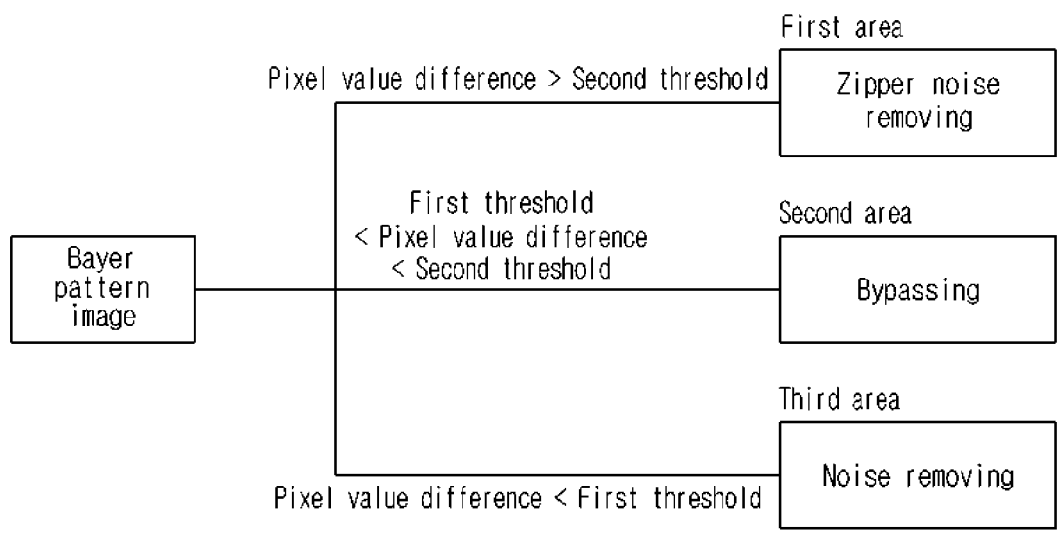
FIG. 27 is a simplified block diagram illustrating the noise removing performed according to the threshold determined in accordance with a fourth embodiment of the present invention.

FIG. 27 is a simplified block diagram illustrating the noise removing performed according to the threshold determined in accordance with a fourth embodiment of the present.

As illustrated in FIG. 27, in the noise removing determined with the threshold in accordance with the present invention, the noise removing method is differently performed according to the threshold. This can be differently applied in accordance with the difference (the pixel value difference), which is the property of image, between the maximum value and the minimum value of pixel.

In FIG. 27, the zipper noise removing of the image corresponding to a first area is performed. Accordingly, the second threshold must be adjusted to be applied to the area determined as the edge. However, due to the property of sensor, in the case of the somewhat high noise level, an area (i.e. a second area) bypassed with the image can be controlled to perform the same operation as the first area by adjusting the second threshold to the first threshold. The first threshold, however, needs to be adjusted depending on the exposure level of camera.

In FIG. 27, the second threshold is determined by the edge property of image. The method of determining whether the pixel value difference has the edge property has already been well-known. Accordingly, the method of setting the first threshold will be disclosed in the present invention.

In FIG. 27, the object of the third area is to remove not an edge noise but a typical noise of image. Accordingly, the first threshold can be set depending on the noise. At this time, the luminance of the image against the illumination intensity of the external surroundings is typically determined by the camera exposure. This will be described with reference to FIG. 21 through FIG. 23, which were referred to in the description of the third embodiment.

As illustrated in FIG. 21, the more changed from low to high the illumination intensity is, the smaller little by little the exposure state becomes. The high illumination of 2,000 lux or more maintains a constant amount of the exposure. The noise level of the image obtained from the camera is varied depending on the exposure level of this camera. FIGS. 22 and 23 illustrate the property curve of a noise level of camera in accordance with the exposure. As illustrated in FIG. 22 and FIG. 23, it typically shows a tendency that the lower the illumination is, the higher the noise level appears and the noise level is constantly maintained in a particular level of illumination intensity or more. Accordingly, the first threshold can be determined depending on the intensity level of illumination. At this time, since the illumination intensity corresponding to the external surroundings determines the exposure level of camera, the first threshold can be set depending on the exposure level of camera. Hereinafter, "first threshold" will be referred to "threshold."

Figure 28:
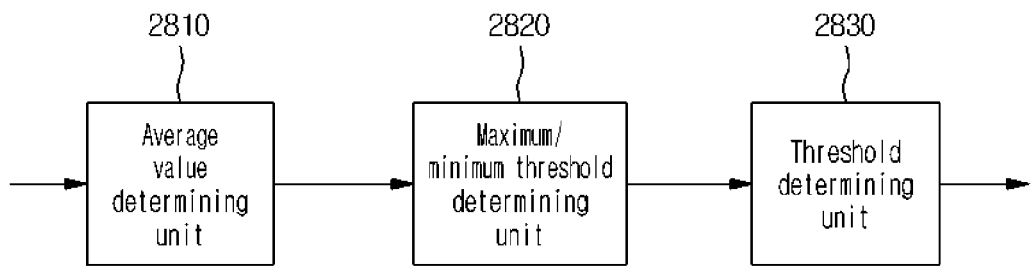
FIG. 28 is a block diagram illustrating a threshold determining apparatus in accordance with a fourth embodiment of the present invention.

FIG. 28 is a block diagram illustrating the threshold determining apparatus in accordance with a fourth embodiment of the present.

As illustrated in FIG. 28, the threshold determining apparatus of the present invention can include an average value determining unit 2810, a maximum/minimum threshold determining unit 2820 and a threshold determining unit 2830.

The average value determining unit 2810 receives the image of the flat surface photographed with the maximum exposure and the minimum exposure, respectively, and randomly acquires samples from the mask, having a uniform size, of the image and calculates the differences between the maximum value and the minimum value of each exposure.

Then, the average value determining unit 2810 calculates each average of these calculated values. At this time, $\text{diff}_{max\ exp}$ refers to the average of the difference between the maximum value and the minimum value of noise in the maximum exposure. $\text{diff}_{min\ exp}$ refers to the average of the difference between the maximum value and the minimum value of noise in the minimum exposure.

The maximum/minimum threshold determining unit 2820 determines the maximum value and the minimum value of the threshold by using the standard deviations of noise in the maximum exposure and the minimum exposure, respectively, received from the aforementioned average value determining unit 2810.

If the maximum value of the threshold refers to "$\text{th}_{max}$" and the minimum value of the threshold refers to "$\text{th}_{min}$," the $\text{th}_{max}$ and $\text{th}_{min}$ can be determined depending on a maximum noise level and a minimum noise level, respectively. It is assumed that the maximum noise is generated in the maximum exposure and that the minimum noise is generated in the minimum exposure. Since the maximum/minimum noises can be calculated by the standard deviation of noise and the average of the difference between the maximum value and the minimum value of noise in each of the maximum exposure and the minimum exposure, the $\text{th}_{max}$ and $\text{th}_{min}$ are represented by the following formulas 82 and 83, respectively.

$$\text{th}_{max} = \text{diff}_{max\ exp} \qquad \text{[Formula 82]}$$

$$\text{th}_{min} = \text{diff}_{min\ exp} \qquad \text{[Formula 83]}$$

If the noise level is high, the threshold must be increased to remove the noise in the third area of FIG. 3.

As described above with reference to FIG. 25 and FIG. 26, a lot of noises mainly appear in the low intensity of illumination, and the low intensity of illumination has the high exposure value. Accordingly, a threshold th is set at a maximum assuming that there are most noises in the maximum exposure value Max Exposure. Also, the $\text{th}_{min}$, which is the minimum of the threshold th, is set in the minimum exposure value Min Exposure, where the exposure is constantly maintained at a particular intensity level of illumination. In the internal area, the threshold having linear properties can be formed. Accordingly, in accordance with the graph property of FIG. 26, the threshold determining unit 2830 can calculate the threshold th depending on the exposure by the following formula 84.

$$th = \frac{th_{max} - th_{min}}{\text{Max Exposure} - \text{Min Exposure}} \cdot \text{Exposure} + \frac{\text{Max Exposure} \cdot th_{min} - \text{Min Exposure} \cdot th_{max}}{\text{Max Exposure} - \text{Min Exposure}} \qquad \text{[Formula 84]}$$

The color interpolation can be performed by using the threshold determined by the above formula 84.

Hereinafter, the threshold calculated by the formula 84 refers to "first threshold." The method of performing the color interpolation with a second threshold determined depending on the edge level will be described.

Figure 29:
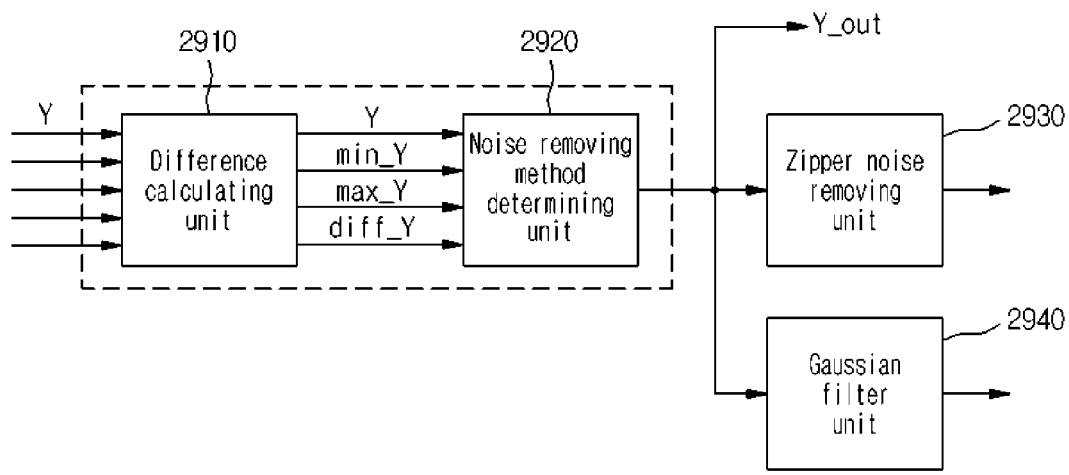
FIG. 29 a block diagram illustrating a noise removing apparatus applied with the threshold determined in accordance with a fourth embodiment of the present invention.

FIG. 29 a block diagram illustrating a noise removing apparatus applied with the threshold determined in accordance with the present invention.

As illustrated in FIG. 29, the noise removing apparatus of the present invention can have a difference calculating unit 2910, a noise removing method determining unit 2920, a zipper noise removing unit 2930 and a Gaussian filter unit 2940.

Hereinafter, although the below description takes the luminance (Y) data, inputted into the noise removing apparatus, as an example, the red/green/blue (RGB) data can be also used.

This is because the RGB data and the Y data can be simply converted to each other by a formula.

The difference calculating unit 2910 of FIG. 29 calculates the maximum value and the minimum value of the elements of inputted 3×3 Y data. The operation of the difference calculating unit 2910 will be described with reference to FIG. 30.

FIG. 30 is a conceptual diagram illustrating the operation of the difference calculating unit 2910 of FIG. 29.

As illustrated in FIG. 30, the difference calculating unit 2910 of FIG. 29 determines the minimum value of inputted 3×3 Y data 3010 as the minimum value min_Y 3020 of 1 pixel and the maximum value of the inputted 3×3 Y data 3010 as the maximum value max_Y 3030 of 1 pixel. The difference diff_Y 3040 between the max_Y 3030 and the min_Y 3020 is determined by using the max_Y 3030 and the min_Y 3020. The 3×3 Y data 3050 is bypassed to remove a noise.

Figure 31:
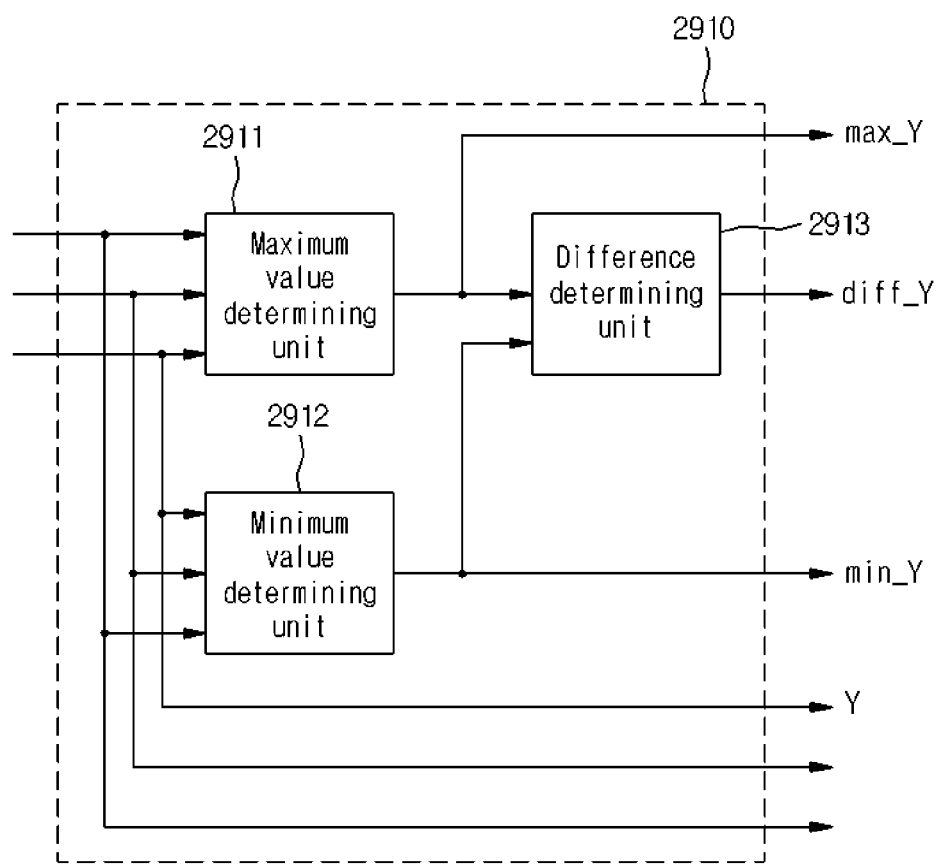
FIG. 31 is a detailed block diagram illustrating an embodiment of the difference calculating unit of FIG. 29.

FIG. 31 is a detailed block diagram illustrating an embodiment of the difference calculating unit 2910 of FIG. 29.

As illustrated in FIG. 31, the difference calculating unit 2910 can have a maximum value determining unit 2911, a minimum value determining unit 2912 and a difference determining unit 2913.

The maximum value determining unit 2911 determines the maximum value max_Y of the elements of 3×3 Y data. The minimum value determining unit 2912 determines the minimum value min_Y of the elements of 3×3 Y data. The difference determining unit 2913 determines the difference diff_Y between the max_Y and the min_Y.

The noise removing method determining unit 2920 preset the first threshold determined in accordance with the present invention and the second threshold determined in accordance with the edge level of image. In case that the difference diff_Y is smaller than the first threshold, the noise removing method determining unit 2920 recognizes the inputted image has no edge and the low intensity of illumination and performs the typical filtering. In other words, the noise removing method determining unit 2920 determines to apply the Gaussian filter unit 2940 to remove the noise. The Gaussian filter unit 2940 performs the Gaussian filtering of this 3×3 Y data. The example of the Gaussian filter unit 2940 of FIG. 31 is illustrated in FIG. 6. Of course, the present invention is limited to the gausian filtering.

In case that the difference diff_Y is the same as or larger than the first threshold and smaller than the second threshold, the noise removing method determining unit 2920 determines that the corresponding image has no edge and is not flat, that is, the image has properties such as an outline (e.g. at this time, referring to as a typical image). Also, the noise removing method determining unit 2920 determines the output Y_out as Y5. That is, the noise removing method determining unit 2920 determines that the image of this area is not necessary to remove the noise.

If the difference diff_Y is the same as or larger than the second threshold, the noise removing method determining unit 2920 determines that the corresponding image has an edge and determines to perform the zipper noise removing. Accordingly, the zipper noise removing unit 2930 performs the zipper noise removing. This will be described with reference to the pertinent drawing.

Figure 32:
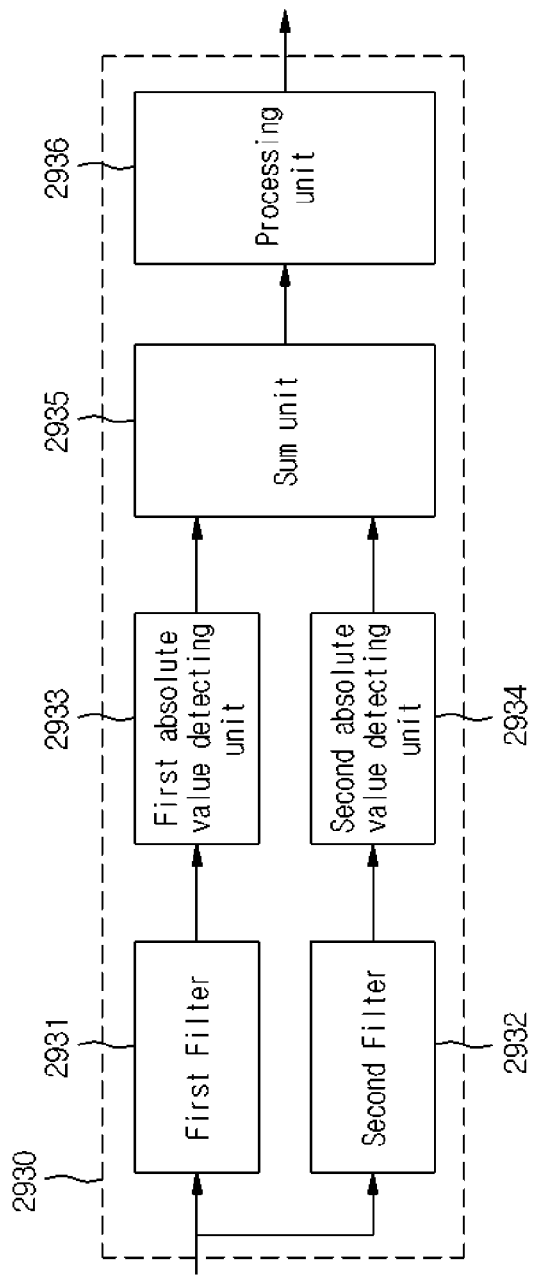
FIG. 32 is a detailed block diagram illustrating an embodiment of the zipper noise removing unit of FIG. 29.

FIG. 32 is a detailed block diagram illustrating an embodiment of the zipper noise removing unit 2930 of FIG. 29.

As illustrated in FIG. 32, the noise removing unit 2930 of the present invention can include a first filter 2931, a second filter 2932, a first absolute value detecting unit 2933, and a second absolute value detecting unit 2934, a sum unit 2935 and a processing unit 2936.

The first and second filter 2931 and 2932, which can be a 3×3 filter, checks how many horizontal and vertical direction edge components of inputted Y components, respectively are. For this, the inputted Y component data is also 3×3 data. In accordance with the embodiment of the present invention, the data such as the 3×3 data 3050 of FIG. 30 is inputted, but the present invention is not limited thereto. It shall be evident that an N×N filter can be used depending on the data inputted into the difference calculating unit 2910.

The example of the first filter and the second filter of FIG. 32 has been described with FIG. 16 and FIG. 17. Also, the example illustrating the data inputted into the first filter and the second filter has already been described with FIG. 18.

The first filter and the second filter, as described above, are to check the horizontal and vertical direction edge components of respective inputted Y component data. Once the Y component data is inputted as illustrated in FIG. 18, elements are multiplied to each component at the same location. The symbol "x" of FIG. 18 refers to the multiplication of elements at the same position.

The first absolute value detecting unit 2933 of FIG. 32 sums the pertinent elements from the output data of the first filter 2931 and detects the absolute value of the sum of the elements. The output data of the first absolute value detecting unit 2933 is performed by the following formula 85.

$$abs\_S1 = abs(Y7 + 2 \times Y8 + Y9 - Y1 - 2 \times Y2 - Y3) \quad \text{[Formula 85]}$$

where "abs" refers to the absolute value. The second absolute value detecting unit 2934 of FIG. 32 sums the respective elements from the output data of the second filter 2932 and detects the absolute value of the sum of the elements. The output data of the second absolute value detecting unit 2934 is performed by the following formula 86.

$$abs\_S2 = abs(Y3 + 2 \times Y6 + Y9 - Y1 - 2 \times Y4 - Y7) \quad \text{[Formula 86]}$$

The sum unit 2935 calculates the sum abs_S of the outputs of the first and second absolute detecting units 2933 and 2934. This is represented by the following formula 87.

$$abs\_S = abs\_S1 + abs\_S2 \quad \text{[Formula 87]}$$

The processing unit 2936 outputs the data Y_out filtered according to the output abs_S of the sum unit 2935. If the abs_S is larger than the third threshold, the processing unit 2936 recognizes there is an edge and determines whether the edge is the horizontal or vertical direction edge.

In other words, if abs_S1 is larger than a value adding abs_S2 to the fourth threshold, the processing unit 2936 determines the output data Y_out as the horizontal direction average of the center row, the center of which is added to the weight. In this case, the output data Y_out is calculated by the following formula 88.

$$Y\_out = \frac{Y4 + 2 \times Y5 + Y6}{4} \quad \text{[Formula 88]}$$

If the abs_S2 is larger than another value adding the abs_S1 to the fourth threshold, the processing unit 2936 determines the output Rout as the vertical direction average of the center column, the center of which is added to the weight. In this case, the output data Y_out is calculated by the following formula 89.

$$Y\_out = \frac{Y2 + 2 \times Y5 + Y8}{4} \quad \text{[Formula 89]}$$

Unless the abs_S1 is larger than the value adding the abs_S2 to the fourth threshold and the abs_S2 is larger than the value adding the abs_S1 to the fourth threshold, when the abs_S is larger than the third threshold, the processing unit 2936 determines the output data Y_out as the horizontal/vertical direction average of the center row/column, the centers of which are added to the weight. In this case, the output data Y_out is calculated by the following formula 90.

$$Y\_out = \frac{4 \times Y5 + Y2 + Y4 + Y6 + Y8}{8} \quad \text{[Formula 90]}$$

If the abs_S is smaller than the third threshold, the processing unit 2936 can recognize the corresponding image has no edge and determine the output data Y_out as Y5, which is the value of the center element of the image.

Here, the third threshold is variable. The fourth threshold can be determined as 50, but not limited thereto.

As such, the processing unit 2936 can control the output data Y_out of the zipper noise removing unit 2930.

As described above, even though the conventional noise removing method has applied one noise removing filer to whole image, the present invention can prevent the system loss by determining the noise removing method depending on the property of image.

As described above, the present invention can provide improved image quality by adjusting a threshold in accordance with the special value (the difference between the maximum value and the minimum value) of the pixels of the mask in an image and applying a different color interpolation method, unlike the conventional noise removing method that has applied one noise removing filer to whole image.

The present invention can also select a suitable color interpolation by adjusting a threshold in accordance with the special value (the difference between the maximum value and the minimum value) of the pixels of the mask in an image. Moreover, the present invention can efficiently remove the noise as a user desires by applying the suitable color interpolation to R, G, and B components. The conventional noise removing method, however, has applied one noise removing filer to whole image The present invention can also make one line memory, requested to remove the noise of a chrominance component, not necessary by directly applying the noise removing to RGB data.

The present invention can also provide improved image quality by setting a threshold in accordance with the noise caused by the exposure level of image and applying a different color interpolation method, unlike the conventional noise removing method that has applied one noise removing filer to whole image.

In addition, the present invention can apply a different noise removing method depending on the threshold, determined in accordance with the analysis of the properties of the image inputted according to the exposure.

The drawings and detailed description are only examples of the present invention, serve only for describing the present invention and by no means limit or restrict the spirit and scope of the present invention. Thus, any person of ordinary skill in the art shall understand that a large number of permutations and other equivalent embodiments are possible. The true scope of the present invention must be defined only by the spirit of the appended claims.

What is claimed is:

1. A threshold determining apparatus comprising:
   a first determining unit, determining standard deviations of noise for images of a flat surface photographed with a maximum exposure and a minimum exposure, respectively;
   a second determining unit, determining a maximum value and a minimum value of a threshold by using the standard deviations of the noise in the maximum exposure and the minimum exposure, respectively, determined by the first determining unit; and
   a third determining unit, determining the threshold by using the maximum value and the minimum value of the threshold, determined by the second determining unit, and the maximum exposure and the minimum exposure.

2. The threshold determining apparatus of claim 1, wherein the second determining unit determines the maximum value of the threshold by use of the following formula:

$$th_{max} = \sigma_{max\ exp}$$

(where $th_{max}$ refers to the maximum value of the threshold, and $\sigma_{max\ exp}$ refers to the standard deviation of the noise in the maximum exposure).

3. The threshold determining apparatus of claim 1, wherein the second determining unit determines the minimum value of threshold by use of the following formula:

$$th_{min} = \sigma_{min\ exp}$$

(where $th_{min}$ refers to the minimum value of the threshold, and $\sigma_{min\ exp}$ refers to the standard deviation of the noise in the minimum exposure).

4. The threshold determining apparatus of claim 1, wherein the third determining unit determines the threshold by use of the following formula:

$$th = \frac{th_{max} - th_{min}}{\text{Max Exposure} - \text{Min Exposure}} \cdot \text{Exposure} + \frac{\text{Max Exposure} \cdot th_{min} - \text{Min Exposure} \cdot th_{max}}{\text{Max Exposure} - \text{Min Exposure}}$$

(where Max Exposure refers to a maximum exposure value, and Min Exposure refers to a minimum exposure value).

5. A threshold determining method comprising:
   determining, by a first determining unit, standard deviations of noise for images of a flat surface photographed with a maximum exposure and a minimum exposure, respectively;
   determining, by a second determining unit, a maximum value and a minimum value of a threshold by using the standard deviations of the noise in the maximum exposure and the minimum exposure, respectively, determined by the operation of determining the standard deviations of the noise; and
   determining, by a third determining unit, the threshold by using the maximum value and the minimum value of the threshold, determined by the operation of determining the maximum value and the minimum value of the threshold, and the maximum exposure and the minimum exposure.

* * * * *